United States Patent
Bissell et al.

(10) Patent No.: US 11,891,561 B2
(45) Date of Patent: Feb. 6, 2024

(54) METAL NITRATE BASED COMPOSITIONS FOR USE AS PHASE CHANGE MATERIALS

(71) Applicant: SUNAMP LIMITED, East Lothian (GB)

(72) Inventors: Andrew John Bissell, East Lothian (GB); David Oliver, East Lothian (GB); Colin Richard Pulham, East Lothian (GB); Emily Jane Goddard, East Lothian (GB); Gylen Odling, East Lothian (GB); Kate Fisher, East Lothian (GB)

(73) Assignee: SUNAMP LIMITED, East Lothian (GB)

( * ) Notice: Subject to any disclaimer, the term of this patent is extended or adjusted under 35 U.S.C. 154(b) by 48 days.

(21) Appl. No.: 17/283,082

(22) PCT Filed: Oct. 8, 2019

(86) PCT No.: PCT/GB2019/052851
§ 371 (c)(1),
(2) Date: Apr. 6, 2021

(87) PCT Pub. No.: WO2020/074883
PCT Pub. Date: Apr. 16, 2020

(65) Prior Publication Data
US 2021/0380860 A1 Dec. 9, 2021

(30) Foreign Application Priority Data
Oct. 8, 2018 (GB) ..................................... 1816380

(51) Int. Cl.
*C09K 5/06* (2006.01)

(52) U.S. Cl.
CPC .............. *C09K 5/063* (2013.01); *Y02E 60/14* (2013.01)

(58) Field of Classification Search
CPC ............ C09K 5/06; C09K 5/063; Y02E 60/14
See application file for complete search history.

(56) References Cited

U.S. PATENT DOCUMENTS

| 4,503,838 A | 3/1985 | Arrhenius et al. |
| 4,540,502 A * | 9/1985 | Kimura .................. C09K 5/063 252/70 |

(Continued)

FOREIGN PATENT DOCUMENTS

| CL | 2018003057 | 12/2018 |
| CL | 2018003750 | 7/2019 |

(Continued)

OTHER PUBLICATIONS

Anonymous: "Reusable Heat Packs—The Wonder of Science", Jul. 8, 2018 (Jul. 8, 2018), XP055656185, Retrived from the Internet: URL: https://thewonderofscience.com/phenomenon/2018/7/8/reusable-heat-packs [retrived on Jan. 9, 2020] the whole document.

(Continued)

*Primary Examiner* — Matthew R Diaz
(74) *Attorney, Agent, or Firm* — MOSER TABOADA

(57) ABSTRACT

There is disclosed herein metal nitrate hydrates as phase change materials (PCMs). More particularly, there is disclosed herein metal nitrate hydrate PCMs containing group II metal nitrates as nucleation agents. A further disclosure herein is the combination of multiple chemical species in the PCM formulation which act together to induce nucleation of metal nitrate PCMs. Furthermore, physical mechanisms by which nucleation of metal nitrate hydrate based PCMs and crystallisation rate increased are disclosed.

7 Claims, 20 Drawing Sheets

(56) References Cited

U.S. PATENT DOCUMENTS

| | | | | |
|---|---|---|---|---|
| 6,083,418 | A * | 7/2000 | Czarnecki | C09K 5/063 165/902 |
| 7,045,077 | B2 * | 5/2006 | Garris | C09K 21/02 423/474 |
| 2005/0167633 | A1 * | 8/2005 | Glausch | C04B 40/0039 252/70 |
| 2010/0038581 | A1 * | 2/2010 | Gladen | C09K 5/063 252/67 |
| 2011/0271692 | A1 * | 11/2011 | Rasmussen | F25D 5/02 62/4 |
| 2013/0174581 | A1 * | 7/2013 | Rasmussen | F25D 5/02 62/4 |
| 2014/0202153 | A1 * | 7/2014 | Wortmann | C09K 5/12 252/71 |

FOREIGN PATENT DOCUMENTS

| | | | |
|---|---|---|---|
| CN | 103479467 | | 1/2014 |
| CN | 108219753 | | 6/2018 |
| DE | 102016206082 | A1 * | 10/2017 |
| GB | 768040 | A * | 2/1957 |
| KR | 2013075980 | A * | 7/2013 |

OTHER PUBLICATIONS

International Search Report, International application No. PCT/GB2019/052851, dated Jan. 21, 2020.

Ding et al., Study on energy storage performance of thermally enhanced composite phase change material of calcium nitrate tetrahydrate, Journal of Energy Storage, 2022, 8 pages, www.elsevier.com/locate/est, https://doi.org/10.1016/j.est.2022.104879.

Emmons et al., Corrosive effect of lithium nitrate trihydrate on common heat exchanger materials, Materials and Corrosion, 2018, pp. 877-887, www.matcorr.com, DOI: 10.1002/maco.201810557.

Hermansson et al., Hydrogen Bond Studies. CXX.* An X-ray Determination of the Crystal Structure of LiNO 3. 3H20, Acta Cryst, 1977, Institute of Chemistry, pp. 2857-2861, B33, University of Uppsala, Box 531, S-751 21 Uppsala, Sweden.

Honcová et al., Calorimetric examination of suitability of calcium, cobalt and nickel nitrate hydrates for thermal energy storage, Journal of Thermal Analysis and Calorimetry, 2020, pp. 275-287, 142, https://doi.org/10.1007/s10973-020-09435-y.

Kannan et al., Phase-Transition Effcacy and Material Compatibility with Thermal Cycling of Lithium Nitrate Trihydrate as a Phase-Change Material, I &EC research, Ind. Eng. Chem. Res. 2022, pp. 16342-16351, 61, https://doi.om/10.1021/acs.iacr.2c02746, pubs.acs.org/IECR.

Novikov et al., Thermodynamic Properties and Phase Equilibria in the H2O—Ca(NO3)2 System, Journal of Chemical & Engineering Data, J. Chem. Eng. Data, 2021, pp. 1839-1855, 66, https://doi.org/10.1021/acs.iced.1c00102, pubs.acs.org/jced.

Shamberger et al., Thermophysical Properties of Lithium Nitrate Trihydrate from (253to 353) K, Journal of Chemical & Engineering Data, J. Chem. Eng. Data, 2012, pp. 1404-1411, 57, dx.doi.org/10.1021/je3000469, pubs.acs.org/jced.

Wang et al., Structure of phase change energy storage material Ca (NO3)2 4H2O solution, Journal of Molecular Liquids, 2022, 10 pages, 119010, www.elsevier.com/locate/molliq, https://doi.org/10.1016/j.molliq.2022.119010.

Wani et al., Solvent Free Synthesis of N-Substituted Pyrroles Catalyzed by Calcium Nitrate, Journal of Heterocyclic Chemistry, 2019, pp. 1337-1340, vol. 56, DOI 10.1002/jhet.

Zhao et al., Research progress in nucleation and supercooling induced by phase change materials, Journal of Energy Storage, 2020, 11pages, 101156, www.elsevier.com/locate/est, https://doi.org/10.1016/j.est.2019.101156.

Zhuravlev et al., AB Initio Study of the Structure and Electronic Properties of Magnesium and Calcium Nitrates and Their Crystal Hydrates, Journal of Structural Chemistry, 2017, pp. 641-649, vol. 58, DOI: 10.1134/S0022476617040011.

Robert D. Shannon, Revised Effective Ionic Radii and Systematic Studies of Interatomic Distances in Halides and Chalcogenides, ResearchGate, Acta Cryst. 1976, 18 pages, https://www.researchgate.net/publication/306153198.

* cited by examiner

METAL NITRATE BASED COMPOSITIONS FOR USE AS PHASE CHANGE MATERIALS

FIELD OF THE INVENTION

The present invention relates to metal nitrate hydrates as phase-change materials (PCMs). More specifically, the present invention relates to metal nitrate hydrates as PCMs with additives to overcome sub-cooling.

BACKGROUND TO THE INVENTION

Latent heat storage makes use of a first-order phase change (solid-to-solid, solid-to-liquid, liquid-to-gas) to store heat energy. On first heating the material will exhibit sensible heat storage: the temperature rises in accordance with the material's specific heat capacity as heat is absorbed. The temperature then remains constant at a certain point when heat energy is absorbed as the phase transition occurs. Once the phase change has taken place the temperature will rise again, as sensible heat storage occurs in the new phase. The advantage over sensible heat storage is that a similar or greater amount of heat can be stored over a much smaller temperature range, and in a smaller volume.

Any material with a high heat of transformation can be used for latent-heat storage, but due to engineering and practicality, certain systems are more feasible to operate than others. Solid-to-solid phase transitions are relatively rare, and liquid-to-gas phase changes have an associated large volume change and therefore present substantial engineering challenges. The majority of PCMs exploited for heat storage exhibit a solid-to-liquid transition. As the solid melts it stores heat—latent heat of fusion ($\Delta H_f$)—and when the liquid freezes it releases the stored heat.

In this field, metal nitrate hydrates are a class of PCMs which may be exploited. They are generally low cost, in many cases non-toxic and typically exhibit large latent heats of fusion. However, there exist issues which must be overcome for their application. As is typical for salt hydrates, metal nitrate hydrates exhibit sub-cooling, the phenomenon whereby a material may remain in a liquid state below its melting point without spontaneous crystallisation. The solution remains kinetically trapped in a metastable state; however, crystallisation may be achieved via the introduction of a nucleation centre.

Nucleation is the initiation process that leads to the formation of a solid phase as molecules, atoms or ions arrange themselves into a continuous superstructure. The initial nucleation centre provides a site upon which dissolved or molten material at the solid/liquid interface can be arranged, and thus the crystal grows. The nucleation process can either occur in the bulk liquid or on a specific surface.

Nucleation centres can be introduced deliberately. Addition of a like crystallite, also known as seeding, provides a nucleation site and can in some cases influence the crystal habit of the crystal that forms. Nucleation centres can also be formed from physical processes, such as sonication. Specific agents, other than the material in question, with a specific surface chemistry or morphology may also induce nucleation, typically referred to as nucleation agents.

However, for many metal nitrate hydrates, no nucleation agents are known by which the problem of sub-cooling may be addressed. Furthermore, crystallisation of such materials may proceed slowly, limiting the thermal power output (rate of heat release from the crystallisation process).

Nucleation agents are largely specific to the materials to which they provide suppression of sub-cooling, and in some cases agents can be found in another crystalline material with similar chemistry, lattice structures and a higher melting point.

Another issue is the range of different melting and crystallisation temperatures exhibited by metal nitrate hydrates, which are wide ranging and may be at points which are inopportune for certain applications.

It is an object of at least one aspect of the present invention to obviate or mitigate at least one or more of the aforementioned problems.

It is a further object of the present invention to provide an improved PCM where minimal or no sub-cooling is exhibited.

It is a further object of the present invention to provide a PCM which may be reliably thermally cycled repeatedly between solid and liquid forms.

It is a further object of the present invention to provide a PCM which may be reliably thermally cycled repeatedly between solid and liquid forms, where the crystallisation rate is increased by physical means such as, but not limited to, agitation or the application of ultrasound.

It is a further object of the present invention to provide a PCM where the temperature of the melting and crystallisation transitions are depressed or tuned or selectable by blending of more than one metal nitrate and/or metal nitrate hydrate components, or addition of another compound that has a melting point depressant effect.

SUMMARY OF THE INVENTION

The present invention relates to the use of combinations of metal nitrates and hydrates thereof with other metal nitrate hydrates and/or metal nitrates as PCMs. These materials are potentially inexpensive and typically melt congruently, two crucial properties of a good PCM.

The present invention also relates to metal nitrate hydrates as phase change materials (PCMs). As discussed in more detail below the metal nitrate hydrate PCMs containing group II metal nitrates may function as nucleation agents.

The present invention of all relates to the combination of multiple chemical species in the PCM formulation which act together to induce nucleation of metal nitrate PCMs.

The present invention also relates to physical mechanisms by which nucleation of metal nitrate hydrate based PCMs and crystallisation rate increased are disclosed.

According to the first aspect of the invention there is provided PCM compositions where a metal nitrate hydrate based PCM is improved to give reduced or no sub-cooling.

For these reasons, the metal nitrate hydrate based PCMs described in the present invention have a wide variety of potential applications in different industries. By way of non-limiting example, the disclosed PCMs may be used for temperature control or thermal buffering in buildings. They may also be used to heat up water or other fluids, or as a method by which rapid cooling of a hot material down to a non-harmful temperature may be achieved. Some of the PCMs disclosed herein exhibit sub-ambient melting transitions and therefore may be used for process cooling, refrigeration and air conditioning applications. Due to the potential of the phase change temperatures of the nitrate based PCMs to be depressed and tuned as described herein, charging of the PCM using cheap, efficient low temperature heat pumps can be achieved. Therefore, the present invention is a key candidate for supplying low emission, low cost heating and cooling solutions.

However, for successful application of metal nitrate based PCMs the issue of sub-cooling must be overcome.

It has been found that metal nitrate based PCMs may be self-nucleated with crystals of the metal nitrate hydrate in question e.g. crystals of calcium nitrate tetrahydrate may be used as a nucleating agent for a calcium nitrate tetrahydrate based PCM, in a process known as seeding. This has been found to avoid sub-cooling, although this method requires seeding after every melting transition as the seed crystals also melt when the material is recharged. Alternatively, it can be that the entirety of the solid calcium nitrate tetrahydrate is never melted, and therefore there are always seed crystals present, but this method may be unreliable and lead to compromised designs.

There are a range of scenarios by which nucleation via seeding may occur. It is disclosed herein that a thin metal plate such as a disc with indentations (e.g. machined grooves) may be used to initiate crystallisation in a subcooled melt by retaining a seed crystal under high pressure in said indentations (e.g. grooves). By ejecting said crystal a nucleation point is produced, and crystallisation of the bulk material may proceed. It is disclosed that this process can be performed on repeated charge-discharge cycles and thereby a fully cyclable PCM system is achieved.

The present invention also relates to a method of overcoming sub-cooling with the addition of a heterogeneous nucleating agent.

A further disclosure in the present invention are group II nitrate hydrates and combinations of group II nitrates which may be used as nucleation agents. Materials such as strontium nitrate, magnesium nitrate or barium nitrate are herein disclosed to be effective nucleation agents for metal nitrate hydrate based PCMs.

The present invention also includes physical means by which the crystallisation rate of a PCM based on one or more metal nitrate hydrates may be increased, such as agitation, recirculation, pumping, sonication, or combinations thereof. These methods are used to break growing crystallites into more numerous smaller crystallites, providing a greater surface area for further crystal growth, and to disperse such particles throughout the PCM.

A preferred embodiment of the present invention is a composition containing calcium nitrate tetrahydrate with the additives strontium nitrate and/or magnesium nitrate, or any of their respective hydrates, by which a fully cyclable PCM that exhibits minimal sub-cooling can be obtained. An extension to the embodiment is to substitute strontium with barium, which is chemically very similar.

The present invention also relates to a range of PCMs based on metal nitrate hydrates wherein the melting transition temperature of the PCM is tuned by the addition of at least one other metal nitrate or hydrate thereof. Thereby a variety of different PCMs where the operational temperature range may be altered as required are disclosed. A further disclosure as part of the present invention is the effective nucleation of such melting point depressed PCMs with the nucleation agents disclosed as part of this invention.

According to a second aspect of the present invention there is provided use of metal nitrates or metal nitrate hydrates as phase change materials (PCMs) with a nucleation agent based on group II metal nitrates or metal nitrate hydrates.

The nucleation may be achieved by a seeding process (i.e. addition of crystals of the same chemical identity as a component of the PCM) to overcome subcooling.

The nucleation agent may be a nitrate salt with more than one distinct cation.

The nucleation agent may be comprised of one or more group II metal nitrate(s) and/or metal nitrate hydrate(s).

The PCM may the nucleated with a nucleating agent that is kept at high pressure (e.g. above atmospheric pressure) during the melting process.

The nucleation agent may be a crystal of one or more components of the PCM that has been kept solid above its melting point by being in a region of high pressure in cracks on the surface of a metal sample.

The metal sample may, for example, be a thin metal disc with machined grooves which may be flexed to release the nucleation agent into the bulk PCM.

The nucleation agent may be comprised of a group II metal nitrate such as magnesium nitrate or any hydrate form thereof.

The nucleation agent may be comprised of a group II metal nitrate such as strontium nitrate or any hydrate form thereof.

The nucleation agent may be comprised of a group II metal nitrate such as calcium nitrate or any hydrate form thereof.

The nucleation agent may be comprised of a group II metal nitrate such as barium nitrate or any hydrate form thereof.

The nucleation agent may be a combination of two or more group II metal nitrates, including any combination of anhydrous and hydrated forms thereof.

The nucleation agent may be a combination of strontium nitrate and magnesium nitrate or any hydrate forms thereof.

The nucleation agent may be a combination of calcium nitrate and magnesium nitrate or any hydrate forms thereof.

The nucleation agent may be a combination of magnesium nitrate and barium nitrate or any hydrate forms thereof.

The nucleation agent may be a combination of strontium nitrate and barium nitrate or any hydrate forms thereof.

The nucleation agent may be a combination of strontium nitrate, barium nitrate and magnesium nitrate or any hydrate forms thereof.

The nucleation agent AB present at a concentration which is above the solubility limit in the bulk PCM.

The nucleation agent may be present in at least about 5%, about 1% or about 0.1% by weight of the PCM.

According to third aspect of the present invention there is provided a PCM comprised of;
at least one metal nitrate hydrate selected from any one of or a combination of a list comprised of:
lithium nitrate, sodium nitrate, potassium nitrate, calcium nitrate, barium nitrate, scandium nitrate, zinc nitrate, copper nitrate, iron nitrate, manganese nitrate, chromium nitrate, strontium nitrate, silver nitrate, yttrium nitrate, zirconium nitrate, titanium nitrate, any lanthanide metal nitrate, ammonium nitrate, aluminium nitrate, bismuth nitrate, gallium nitrate, magnesium nitrate, lead nitrate;
and/or any hydrate form thereof;
and a nucleation agent as defined herein.

The PCM aside from the nucleation agent may be a mixture of more than one metal nitrate and/or metal nitrate hydrate.

The PCM may have a melting temperature lower than that of each chosen component individually.

Typically, by altering the amounts of the chosen metal nitrates and/or hydrates thereof, the melting point of the PCM is capable of being tuned to a specific point within a range of values.

The PCM may be a eutectic mixture of the chosen components.

The PCM may be a binary, ternary or quaternary eutectic mixture of the chosen components.

The PCM may be comprised of; between about 98% and 99.6% by weight of at least one metal nitrate hydrate, between about 0.2% and 1% by weight strontium nitrate or any hydrate thereof and between about 0.2% and 1% by weight magnesium nitrate or any hydrate thereof.

The PCM may be comprised of: between about 0% and 99.8% by weight calcium nitrate tetrahydrate; between about 0% and 1% by weight strontium nitrate tetrahydrate; between about 0% and 1% by weight magnesium nitrate hexahydrate; between about 0% and 1% by weight barium nitrate; between about 0% and 99.8% by weight lithium nitrate trihydrate; between 0% and 50% by weight manganese nitrate tetrahydrate; between about 0% and 99.8% by weight manganese nitrate hexahydrate; between about 0% and 99.8% by weight zinc nitrate hexahydrate; between about 0% and 99.8% by weight copper nitrate hexahydrate; between about 0% and 40% by weight copper nitrate trihydrate; between about 0% and 40% by weight copper nitrate hemipentahydrate; between about 0% and 99.8% by weight iron nitrate nonahydrate; between about 0% and 10% by weight sodium nitrate; and between about 0% and 30% by weight potassium nitrate.

The PCM may be comprised of, about 99.2% by weight calcium nitrate tetrahydrate, about 0.4% by weight strontium nitrate tetrahydrate and about 0.4% by weight magnesium nitrate hexahydrate.

The PCM may be comprised of; about 99.3% by weight calcium nitrate tetrahydrate, about 0.3% by weight barium nitrate and about 0.4% by weight magnesium nitrate hexahydrate.

The PCM may be comprised of; about 99.4% by weight calcium nitrate tetrahydrate, about 0.3% by weight strontium nitrate and about 0.3% by weight magnesium nitrate dihydrate.

The PCM may be comprised of; about 57.2% by weight calcium nitrate tetrahydrate, about 42.0% by weight lithium nitrate trihydrate, about 0.4% by weight magnesium nitrate hexahydrate and about 0.4% by weight strontium nitrate tetrahydrate.

The PCM may be comprised of; about 40.0% by weight calcium nitrate tetrahydrate, about 29.4% by weight lithium nitrate trihydrate, about 29.8% by weight copper nitrate hexahydrate, about 0.4% by weight magnesium nitrate hexahydrate and about 0.4% by weight strontium nitrate tetrahydrate.

The PCM may be comprised of; about 32.1% by weight calcium nitrate tetrahydrate, about 23.5% by weight lithium nitrate trihydrate, about 23.8% by weight copper nitrate hexahydrate, about 19.8% by weight zinc nitrate hexahydrate, about 0.4% by weight magnesium nitrate hexahydrate and about 0.4% by weight strontium nitrate tetrahydrate.

The PCM AB comprised of; about 24.0% by weight calcium nitrate tetrahydrate, about 17.6% by weight lithium nitrate trihydrate, about 17.9% by weight copper nitrate hexahydrate, about 39.7% by weight manganese nitrate hexahydrate, about 0.4% by weight magnesium nitrate hexahydrate and about 0.4% by weight strontium nitrate tetrahydrate.

The PCM may be comprised of; about 39.7% by weight calcium nitrate tetrahydrate, about 59.5% by weight copper nitrate hexahydrate, about 0.4% by weight strontium nitrate tetrahydrate and about 0.4% by weight magnesium nitrate hexahydrate.

The PCM may be comprised of; about 59.5% by weight calcium nitrate tetrahydrate, about 39.7% by weight zinc nitrate hexahydrate, about 0.4% by weight strontium nitrate tetrahydrate and about 0.4% by weight magnesium nitrate hexahydrate.

The PCM may be comprised of; about 44.6% by weight calcium nitrate tetrahydrate, about 54.6% by weight iron nitrate nonahydrate, about 0.4% by weight strontium nitrate tetrahydrate and about 0.4% by weight magnesium nitrate hexahydrate.

The PCM may the comprised of; about 69.4% by weight zinc nitrate hexahydrate, about 29.8% by weight lithium nitrate trihydrate, about 0.4% by weight strontium nitrate tetrahydrate and about 0.4% by weight magnesium nitrate hexahydrate.

The PCM may be comprised of; about 39.7% by weight iron nitrate nonahydrate, about 34.1% by weight calcium nitrate tetrahydrate, about 25.4% by weight lithium nitrate trihydrate, about 0.4% by weight magnesium nitrate hexahydrate and about 0.4% by weight strontium nitrate tetrahydrate.

The PCM may be comprised of; about 14.7% by weight manganese nitrate hexahydrate, about 83.3% by weight zinc nitrate hexahydrate, about 1% by weight strontium nitrate and about 1% by weight barium nitrate.

According to fourth aspect of the present invention there is provided a method of increasing the rate of crystallisation of a PCM according to any preceding claim by mechanical manipulation of nucleation centres including agitation, recirculation, pumping, sonication, or combinations thereof.

One or more growing crystallites may be dispersed throughout the PCM.

A nucleation agent may be dispersed throughout the PCM.

One or more growing crystallites may be divided into a greater number of smaller crystallites.

According to fifth aspect of the present invention there is provided a method of preparing a PCM as defined herein and as defined in any of the first to fourth aspects comprising:
 providing at least one metal nitrate hydrate and at least one other metal nitrate and/or metal nitrate hydrate, and
 heating the mixture above the melting transition temperature of one or more of the components and stirring to form a single pourable liquid.

An anhydrous metal nitrate and/or a metal nitrate hydrate of a lower hydration number than is desired in the final PCM composition may be used in place of one or more metal nitrate hydrate(s) with the addition of an amount of water to give the final PCM composition.

A metal nitrate hydrate with a higher hydration number than is desired in the PCM composition may be used, and the excess water removed by or saturated with one or more anhydrous metal nitrate(s) and/or lower hydrate metal nitrate salt(s) to give the final PCM composition.

A metal nitrate solution may be used, and the excess water removed or saturated with one or more anhydrous metal nitrate(s) and/or lower hydrate metal nitrate salt(s) to give the final PCM composition.

The metal nitrate and/or metal nitrate hydrate may have been synthesised or produced by reaction.

The PCM may be formed by neutralisation of nitric acid by the corresponding basic metal salt in the presence of the correct amount of water to achieve a specific composition.

The PCM may be formed by neutralisation of nitric acid by the corresponding metal bases in the presence of excess water which is then removed or saturated with one or more anhydrous metal nitrate(s) and/or lower hydrate metal nitrate salt(s) to give the final PCM composition.

Any anion other than nitrate may be removed by ion exchange, or precipitation with an appropriate metal salt followed by physical separation.

DESCRIPTION OF THE FIGURES

The invention will now be described with reference to the following Figures in which.

DETAILED DESCRIPTION

Figure 1:
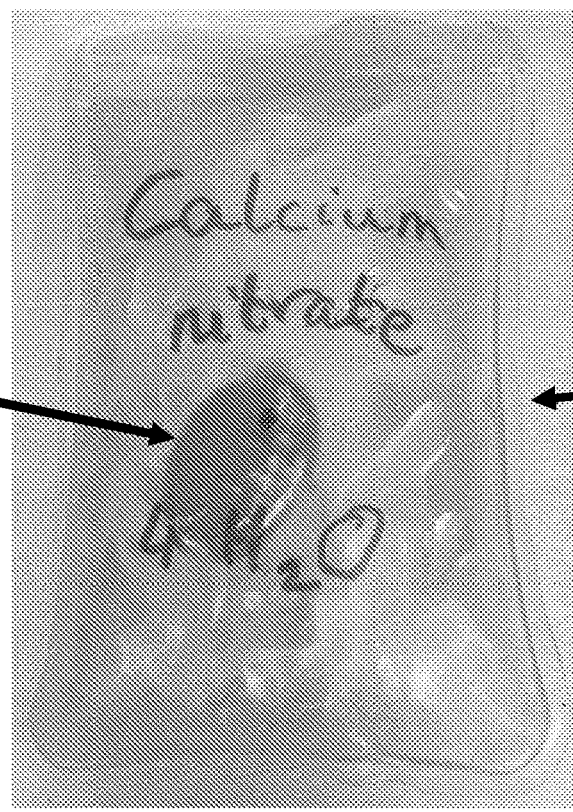
FIG. 1 is a representation of a bag filled with calcium tetrahydrate with a flexible metal disk located therein according to an embodiment of the present invention.

The present invention relates to the use of metal nitrates as a PCM. In particular, the present invention relates to a metal nitrate hydrate containing one or more metal nitrates, or hydrates thereof, as a PCM.

Metal nitrate hydrates are known to have melting points in a broad range from near ambient upwards, and generally high latent heats of fusion. The inventors have unexpectedly found that these attributes are highly attractive for use as a PCM as these materials are typically inexpensive and melt congruently (i.e. forms only a single homogeneous liquid phase upon melting). However, many of such metal nitrate hydrates sub-cool. Therefore, the disclosed invention describes PCM compositions where nucleation occurs due to the introduction of a nucleation agent additive, as well as methods by which such an additive may be introduced into the PCM. Thereby the inventors disclose PCMs which may be thermally cycled between charged and discharged states repeatedly with reliable crystallisation on each cycle.

In addition to providing various reliable nucleation agents for metal nitrate based PCMs, a number of melting point depressed metal nitrate based PCMs are disclosed herein. Selecting from a number of metal nitrates and their corresponding hydrates, the present invention discloses PCMs with melting transitions as low as, for example, 3° C. The disclosed PCM compositions are comprised of a metal nitrate hydrate and at least one other metal nitrate and/or hydrate thereof, and a nucleation agent as disclosed herein.

For an additive to be a successful melting point depressor of a PCM, it should have the following properties:
A common ion (e.g. $NO_3^-$)
Similar density to the main component of the PCM
Similar pH to the main component of the PCM
Soluble in the main component of the PCM The suitability of a range of metal nitrates and metal nitrate hydrates is herein established as a suitable, tuneable melting point depressor for metal nitrate hydrates.

The materials disclosed for this purpose are, for example, selected from any one of or combination of the following: lithium nitrate, sodium nitrate, potassium nitrate, calcium nitrate, barium nitrate, scandium nitrate, zinc nitrate, copper nitrate, iron nitrate, manganese nitrate, chromium nitrate, silver nitrate, yttrium nitrate, zirconium nitrate, titanium nitrate, any lanthanide metal nitrate, ammonium nitrate, aluminium nitrate, bismuth nitrate, gallium nitrate, or any hydrate thereof. Wherein any of these metal nitrates and/or hydrates thereof may be used alone or as a mixture with one or more others from said list, with a nucleation agent as disclosed herein.

Several metal nitrates and their hydrates are known to the inventors as being PCMs, melting point depression agents and/or nucleation agents, however they are disregarded due to their hazardous nature. These materials are beryllium nitrate, cadmium nitrate, nickel nitrate, cobalt nitrate, mercury nitrate and any actinide nitrate, or any hydrate thereof.

The present inventors have found that it is possible to induce nucleation in metal nitrate hydrates where subcooling occurs so that they may be used as fully thermally cyclable PCMs.

A system comprised of a metal nitrate hydrate may be nucleated with crystals of itself i.e. crystals of the solid form of that metal nitrate hydrate. The present application describes a method of overcoming sub-cooling in metal nitrate hydrates by using seeding i.e. addition of crystals of calcium nitrate tetrahydrate to a sub-cooled melt of calcium nitrate tetrahydrate.

On appreciating this, the present invention describes methods of adding seed crystals to the system to initiate crystallisation.

A thin metal plate (e.g. a disk) with indentations (e.g. grooves such as machined grooves) which may be flexed back and forth may be used in the presence of a metal nitrate hydrate to produce seed crystals. It is believed that crystallites in the cracks of the machined grooves are under high pressure and therefore do not melt during the heating step where the bulk becomes molten. When the disc is flexed, the crystallites are ejected into the bulk, giving nucleation centres from which further crystal growth can occur rapidly.

The inventors have found that flexing such a disc in contact with crystalline metal nitrate hydrates may be used to load crystallites into the aforementioned machined grooves in the disc, which then may be subsequently used to provide nucleation sites.

Thus, encapsulation of metal nitrate hydrates in a container fitted with a flexible piece of metal with grooves capable of maintaining crystallites at sufficient local pressure within the grooves gives a route to nucleation by in situ seed crystal release.

The present invention also discloses heterogeneous nucleation agents for metal nitrate hydrates, defined as a material which is in the solid phase at the temperatures around the melting transition temperature of the bulk PCM. It is disclosed herein that while the individual metal nitrate or hydrate thereof may not act as a nucleation agent, when two or more of such species are present then a PCM which reliably nucleates with minimal or no sub-cooling is obtained.

It has been found that the combination of more than one metal nitrate hydrate or anhydrous metal nitrate provides a successful nucleation agent for the metal nitrate hydrates and metal nitrate hydrates with melting point depression agents. It would generally be expected that any additive acting as a heterogenous nucleator should work alone, but surprisingly, the individual nitrates or hydrates thereof do not nucleate the PCM but work only when combined.

Without wishing to be bound to any particular theory, it is suggested herein that the combination of magnesium and strontium nitrates with calcium nitrate forms a trimetallic complex comprised of strontium-magnesium-calcium nitrate. It is known that an analogous trimetallic phosphate species exists (CAS number: 61114-28-1). The inventors suggest that such a trimetallic species may form with nitrate anions and that this species is the active nucleation agent for the disclosed metal nitrate based PCMs. Formation of this species in the disclosed PCM formulations may occur when a pair of cations is added to a saturated calcium nitrate solution.

An alternative theory is that one cation alters the crystal surface or faces of crystallites of the other when submerged in a nitrate solution, such as molten calcium nitrate tetrahydrate.

In the present invention it is established that group II metal nitrates and their respective hydrates may be effective nucleation agents for metal nitrate based PCMs. Typically group II nitrates may be purchasable as the metal nitrate hydrates or anhydrous metal nitrates. These materials are known to have different crystal structures and typically form with different particle sizes and dimensions, and thus will behave differently as nucleation agents. By hydration or recrystallisation a chosen metal nitrate or hydrate thereof may be converted to a different hydrate or anhydrous form, thereby arriving at different potential nucleation agents for metal nitrate based PCMs.

Slow crystallisation of PCMs has been found to limit the thermal output power of an energy storage system comprised of said PCM. An aspect of the present invention is to overcome this issue by the application of a variety of methods to break the growing crystallites into a multitude of smaller crystallites, disperse crystallites throughout the PCM, and disperse the nucleator throughout the PCM. Methods such as agitation, recirculation, pumping, sonication, or combinations thereof are disclosed as part of the present invention as solutions to slow crystallisation of metal nitrate based PCMs.

A further aspect of the present invention is the preparation methods of PCMs based on metal nitrate hydrates containing melting point depressors and/or effective nucleation agents.

The PCM formulations disclosed in the present invention may be prepared by reaction of metal ion precursors with a source of nitrate ions, where the metal precursors may be metal oxides, metal carbonates, metal hydroxides, a metal salt bearing an anion other than nitrate, or combination thereof.

The PCM formulations disclosed in the present invention may be prepared by addition of a commercially available metal nitrate hydrate or anhydrous metal nitrate, or by the combination of an anhydrous metal nitrate and an amount of water required to give a metal nitrate hydrate.

Where required in an anhydrous form, metal nitrate hydrates may be dehydrated by heating, under reduced pressure, dehydrated in situ (i.e. within the PCM) or combination thereof to give the anhydrous salt for use in the disclosed PCM formulations.

Where a metal salt bearing an anion other than nitrate is used to prepare the PCMs disclosed herein, removal of the original anion may be achieved by ion exchange or precipitation with an appropriate metal nitrate which would give an insoluble product which may be removed by physical means.

Below are given non-limiting examples of the present invention:

Example 1

FIG. 1 depicts a representation of a bag generally designated 10 filled with calcium tetrahydrate with a flexible metal disk 12 located therein. The flexible metal disk 12 has a number of surface grooves.

Figure 2:
FIG. 2 shows crystal growth from a nucleation centre created by flexing a metal disk located therein according to an embodiment of the present invention.

In such a system, after heat-sealing, re-melting and allowing a pouch to cool to room temperature, crystallisation can be achieved by flexing the metal disk 12, giving a nucleation centre in the vicinity of the metal disk 12 as shown in FIG. 2.

Figure 3:
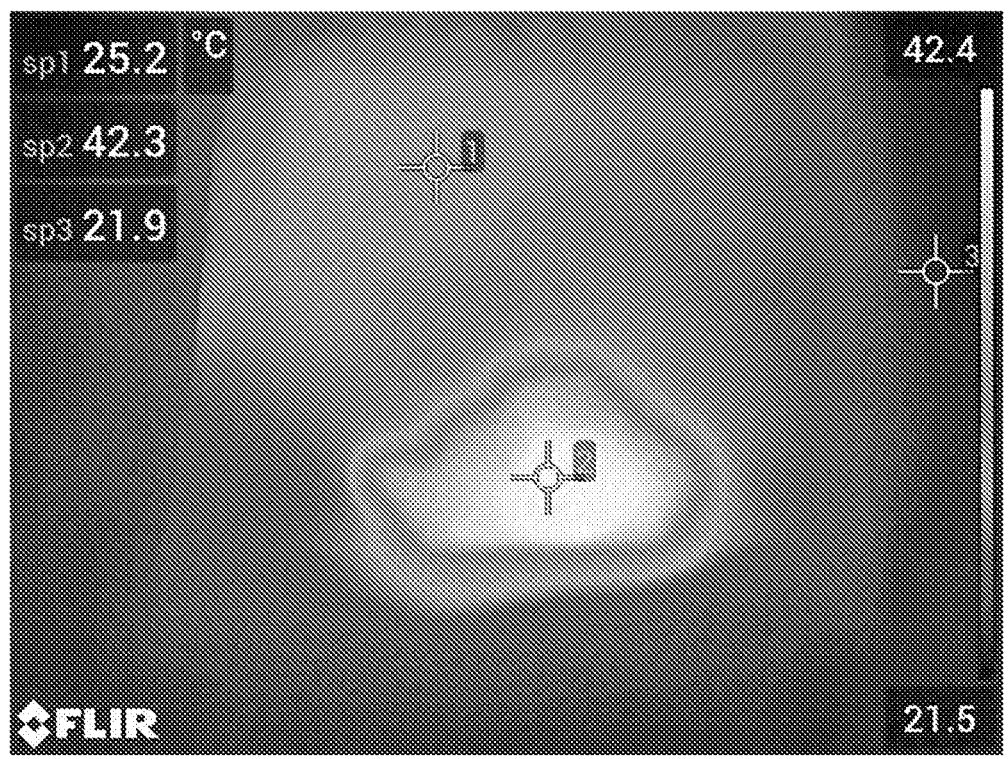
FIG. 3 is a representation of the bag shown in FIG. 1 where a metal disk has been flexed to initiate nucleation of the calcium nitrate tetrahydrate to provide a temperature rise to 42.3° C. at the point of nucleation.
Figure 4:
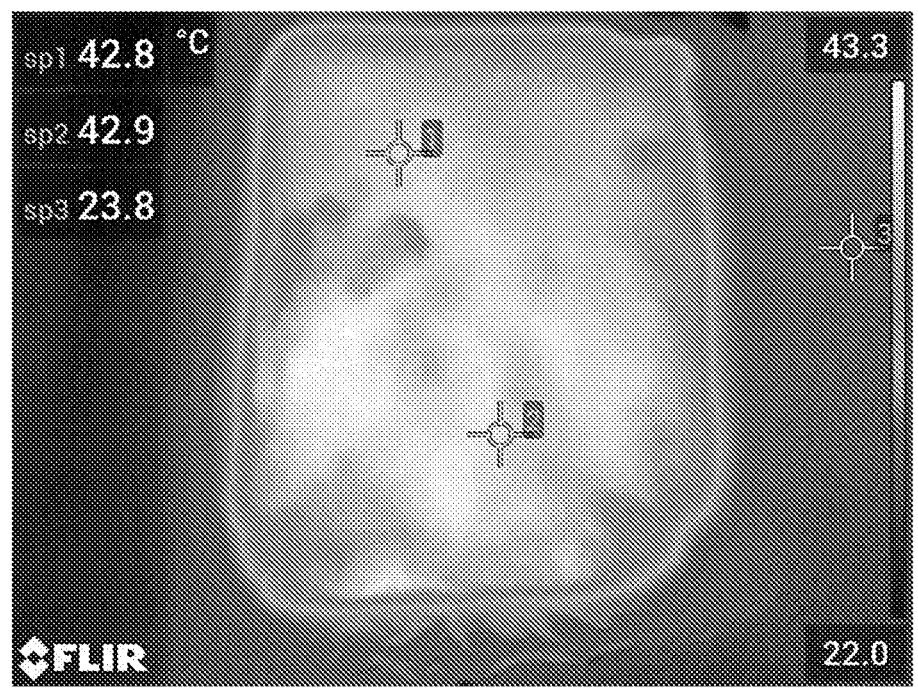
FIG. 4 is a representation of the bag shown in FIG. 2 where the temperature has risen to around 43° C. after the material is allowed to fully crystallise.

Heat release may be tracked using a thermal imaging camera as shown in FIGS. 3 and 4.

In FIG. 3, the nucleation of the calcium nitrate tetrahydrate ($Ca(NO_3)_2.4H_2O$) has been initiated by the flexing of the metal disk. In the area where crystals are formed the temperature rises to 42.3° C.

In FIG. 3, the temperature has risen to 42.8-42.9° C. on full crystallisation of the pouch.

The inventors find that the contents of the bag may be re-melted several times and crystallised reliably by this method, and thereby provide a technique for initiating the crystallisation of calcium nitrate tetrahydrate.

Example 2

Strontium nitrate is easily available in anhydrous form, and the tetrahydrate can be formed by recrystallising saturated solutions from water at low temperatures.

Addition of strontium nitrate tetrahydrate to a vial of sub-cooled calcium nitrate tetrahydrate did not result in crystallisation.

Figure 5:
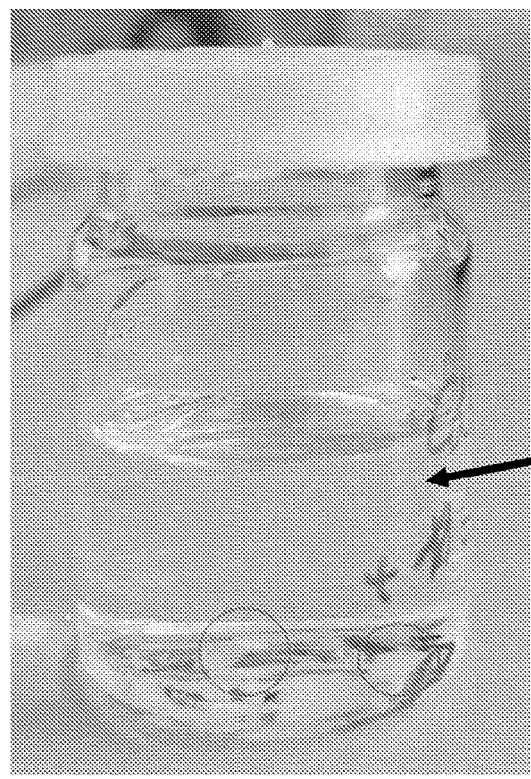
FIG. 5 shows a vial of molten salt containing two crystals of strontium nitrate tetrahydrate (circled) according to a further embodiment of the present invention.

FIG. 5 shows a vial 20 of molten salt containing two crystals of strontium nitrate tetrahydrate (circled). It can clearly be seen that no crystallisation has taken place.

However, it is found that addition of magnesium nitrate hexahydrate to this mixture of calcium nitrate tetrahydrate and crystals of strontium nitrate tetrahydrate causes nucleation of the calcium nitrate tetrahydrate.

Figure 6:
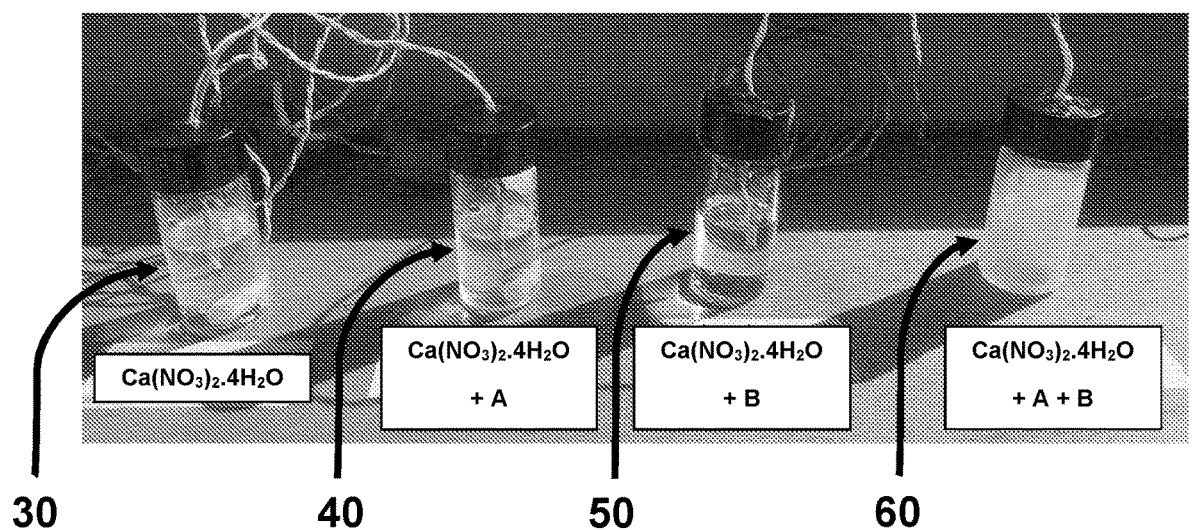
FIG. 6 shows a comparison of vials containing calcium nitrate tetrahydrate, calcium nitrate tetrahydrate and nucleators A and B individually, and a vial of calcium nitrate tetrahydrate containing both nucleator A and nucleator B together at ambient conditions. In this figure, nucleator A and B are defined as magnesium nitrate hexahydrate and strontium nitrate tetrahydrate respectively.

FIG. 6 shows a comparison of vials containing calcium nitrate tetrahydrate and each of the nucleation agents individually, as well as both nucleation agents together at a temperature below the freezing transition temperature of calcium nitrate tetrahydrate. Clearly, both the vial of pure calcium nitrate tetrahydrate (30), and calcium nitrate tetrahydrate containing only magnesium nitrate hexahydrate (A) (40) or strontium nitrate tetrahydrate (B) (50) are seen to be sub-cooled. However, the vial containing calcium nitrate tetrahydrate and both A and B (60) nucleation agents can be seen to have crystallised.

This combination of magnesium nitrate hexahydrate and strontium nitrate tetrahydrate is found to be repeatably thermally cyclable, reliably crystallising where a sample of pure calcium nitrate tetrahydrate, or calcium nitrate tetrahydrate containing only one of the two components of the nucleation agent, would sub-cool without nucleation.

Figure 7:
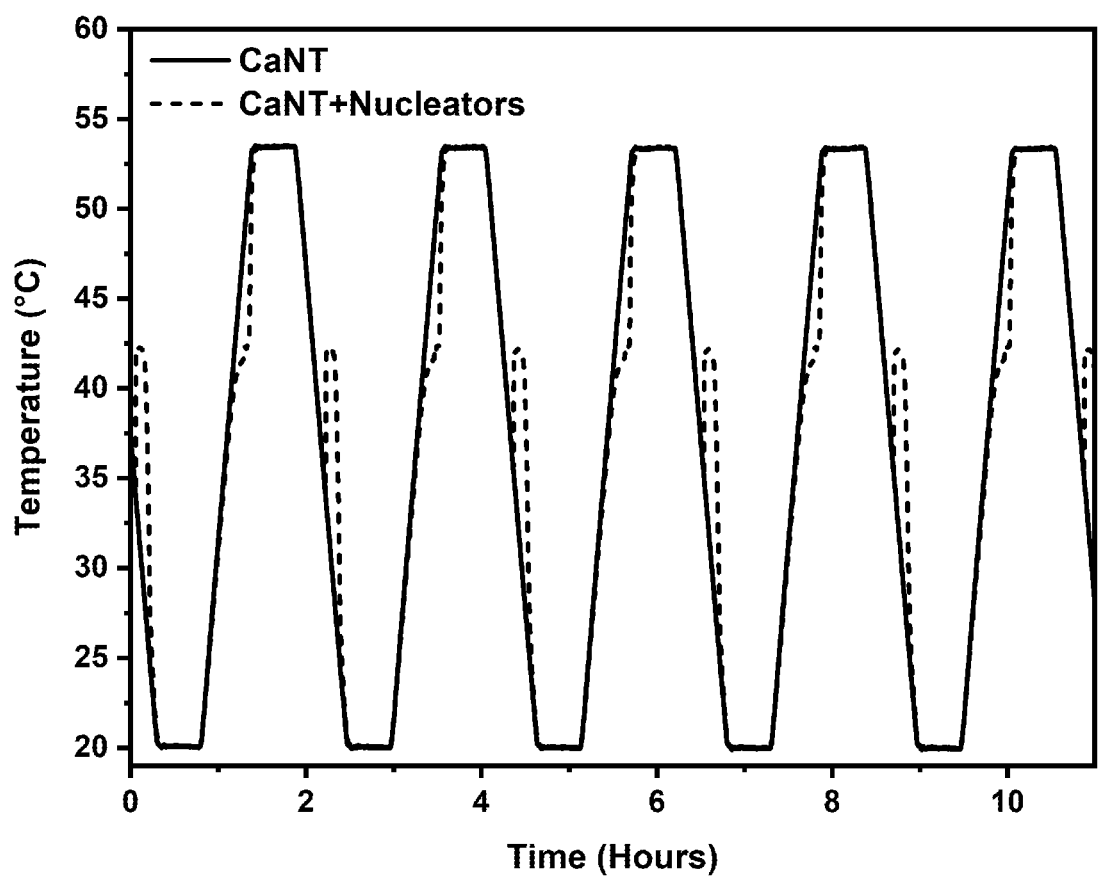
FIG. 7 shows initial thermal cycles of a sample of pure calcium nitrate tetrahydrate and a sample of calcium nitrate tetrahydrate containing the magnesium nitrate hexahydrate and strontium nitrate tetrahydrate nucleation agents.

FIG. 7 shows initial thermal cycles of a sample of pure calcium nitrate tetrahydrate and a sample of calcium nitrate tetrahydrate containing the magnesium nitrate hexahydrate and strontium nitrate tetrahydrate nucleation agents. No nucleation of the pure calcium nitrate tetrahydrate is observed, whereas a crystallisation plateau and subsequent melting transition can be seen in the sample containing the nucleators disclosed herein.

Figure 8:
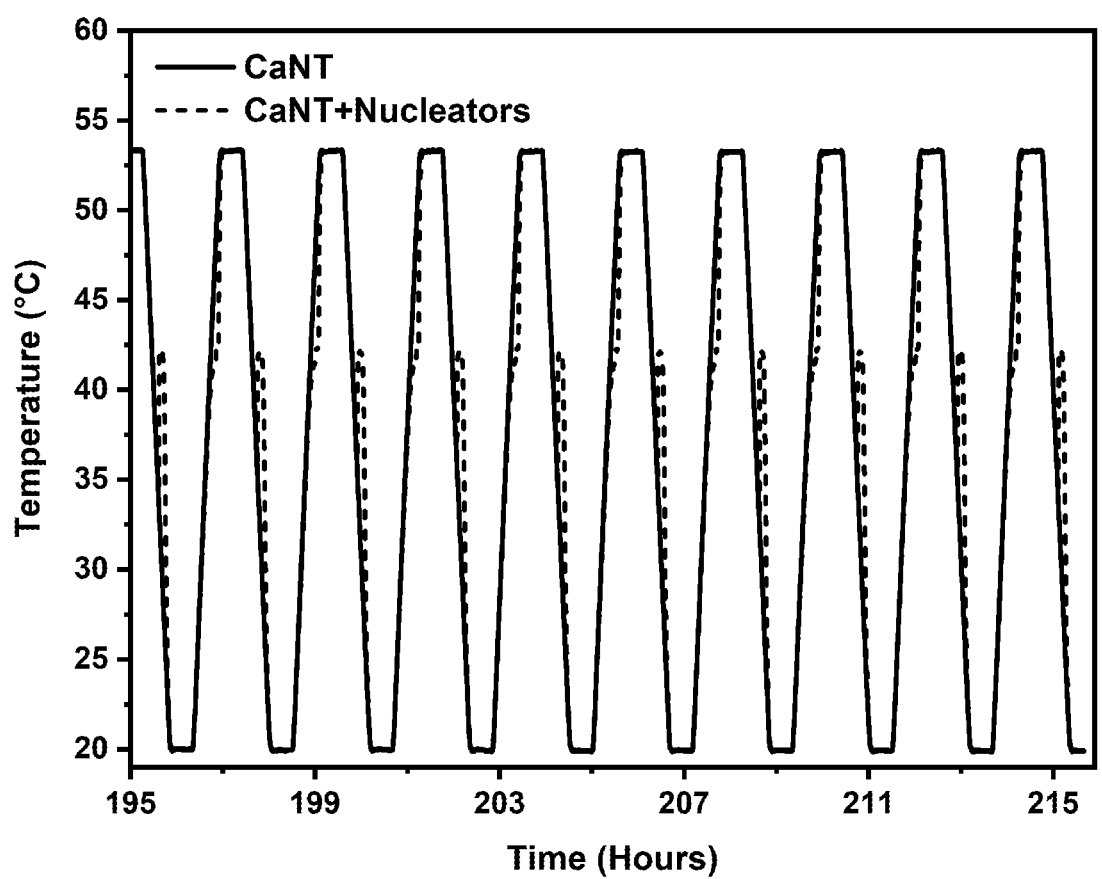
FIG. 8 shows the same samples as defined in FIG. 6 after around 200 hours of thermal cycling.

FIG. 8 shows the same samples as defined in FIG. 6 after around 200 hours of thermal cycling. No change in the melting and crystallisation plateaus is noted between the cycles shown and those shown in FIG. 7. The nucleation agents disclosed in the present invention are therefore found to be effective over prolonged thermal cycling.

Example 3

An amount of calcium carbonate was added to nitric acid solution such that about a 1:2 molar ratio of calcium ions and nitrate ions was achieved. The nitric acid solution concentration was chosen such that the total water content in the final mixture matched the composition of calcium nitrate tetrahydrate (around 30 wt % water), taking into account the water of neutralisation produced by the reaction. An amount of anhydrous strontium nitrate and an amount of water corresponding to about 4 equivalents with respect to the strontium nitrate were then added with stirring. An amount of commercial magnesium nitrate hexahydrate was then added to give the final PCM composition.

Example 4

A PCM comprised of calcium nitrate tetrahydrate, strontium nitrate tetrahydrate and magnesium nitrate hexahydrate was introduced into a heat battery apparatus fitted with a heat exchanger with inlet and outlet pipes via which a heat transfer fluid may be circulated through the battery. The PCM was then thermally cycled by circulating heated or cooled heat transfer fluid through the heat exchanger, and the energy determined by measuring the flow rate and temperature of the inlet and outlet of the heat exchanger.

Figure 9:
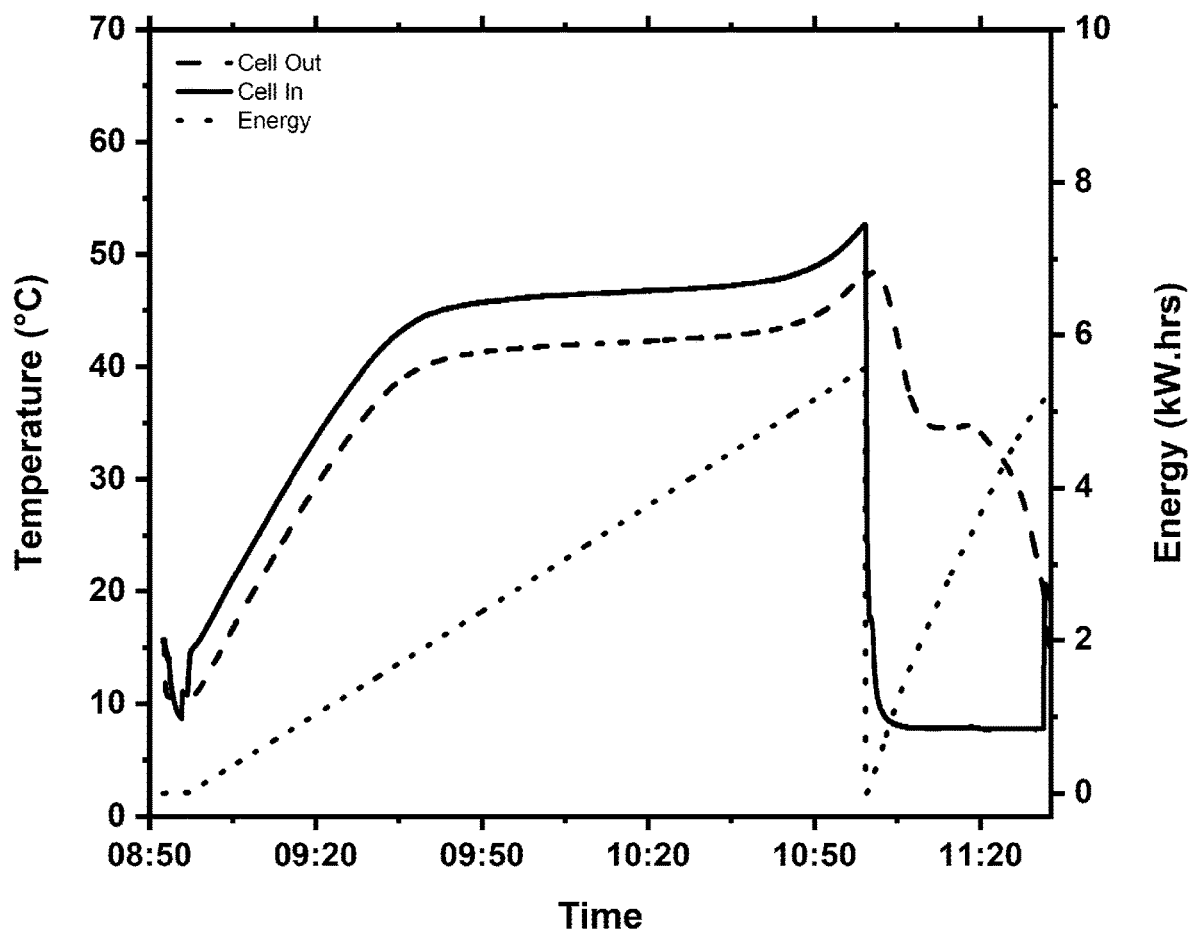
FIG. 9 shows a charge and discharge cycle of a heat battery filled with a PCM as disclosed in the present invention.

FIG. 9 shows a standard charge and discharge cycle of the heat battery-PCM set up. On charging a plateau at around 43° C. can be noted and upon passing a cold heat transfer fluid through the heat exchanger to discharge crystallisation occurs giving a crystallisation plateau at around 35° C.

Example 5

Figure 10:
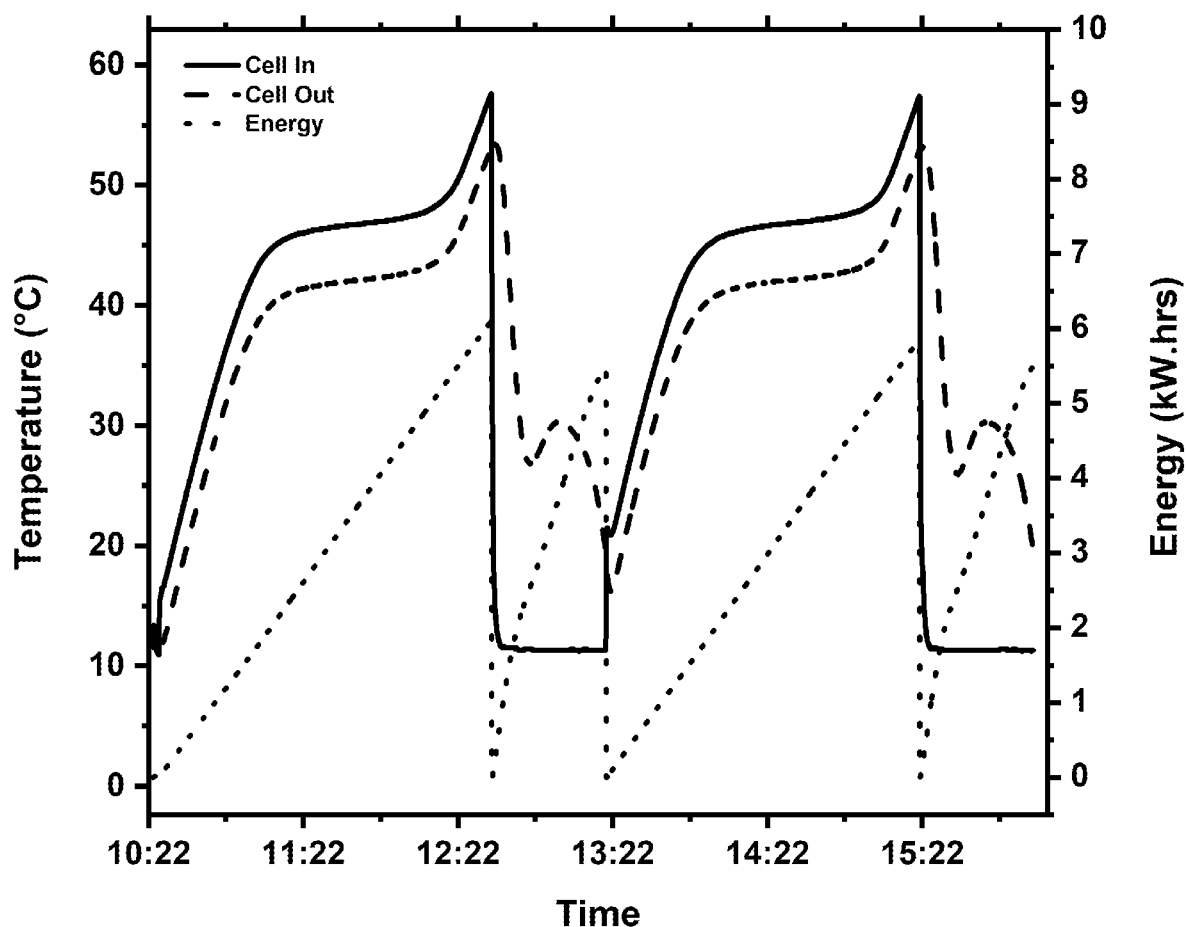
FIG. 10 shows two charge and discharge cycles of a heat battery filled with a PCM consisting only of calcium nitrate tetrahydrate.

A similar heat battery set up to that described in Example 4 was prepared, but filled with pure calcium nitrate tetrahydrate. FIG. 10 shows two charge and discharge cycles of this heat battery. It was found that, on discharging, the material would sub-cool down to around 27° C., after which point nucleation occurred, producing around a 30° C. plateau temperature. Nucleation was driven by a seed crystal present in the battery, as the bulk PCM was not completely molten before discharging began.

Figure 11:
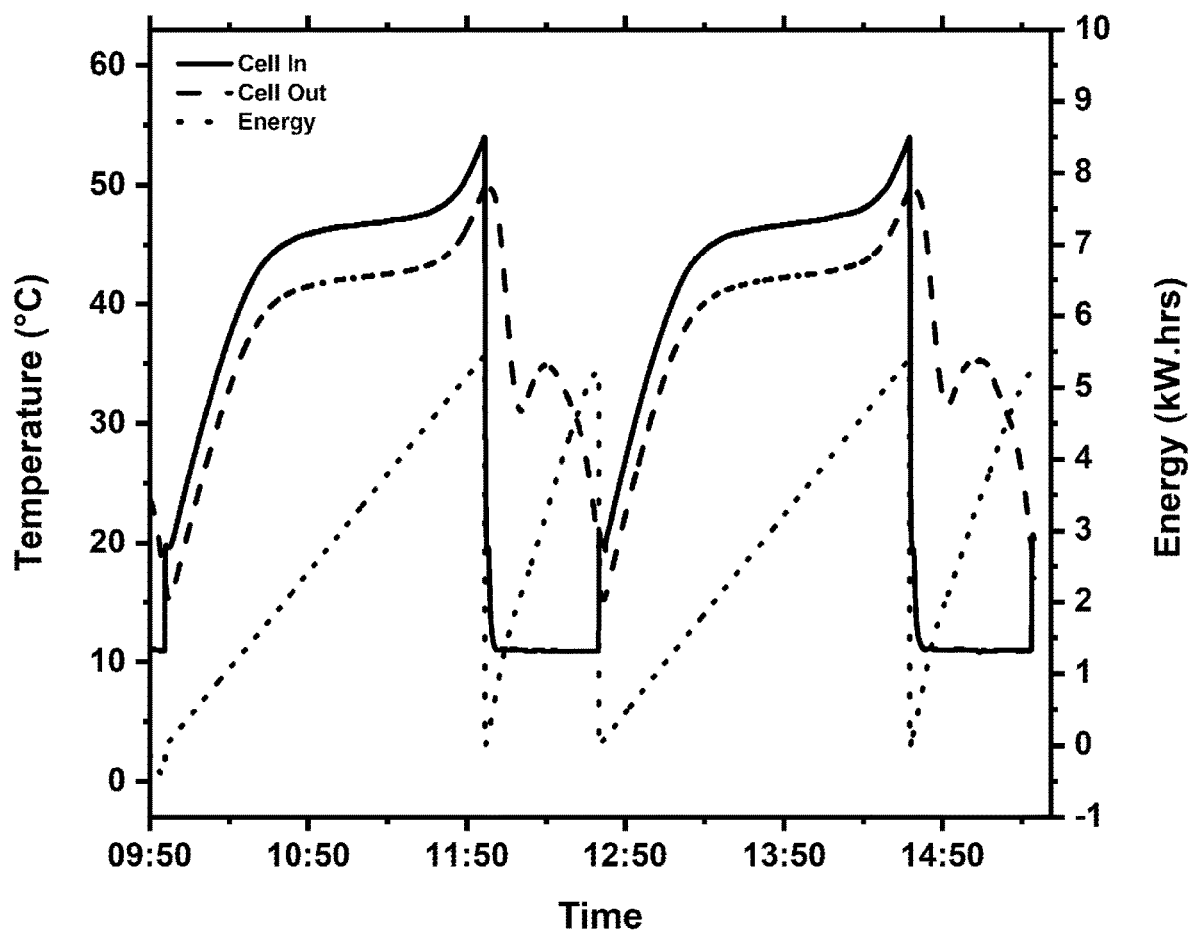
FIG. 11 shows two charge and discharge cycles of the same heat battery as was charged and discharged in FIG. 10 after the addition of strontium nitrate tetrahydrate and magnesium nitrate hexahydrate nucleation agents.

Strontium nitrate tetrahydrate and magnesium nitrate hexahydrate were then added to the battery and the test repeated. The charge and discharge profiles of the battery after nucleation agent addition is shown in FIG. 11. The temperature at which the PCM nucleated was found to rise to about 31° C., and the plateau temperature was found to rise to 35° C. It is hereby demonstrated that the addition of nucleation agents to calcium nitrate tetrahydrate is an effective method by which the nucleation and crystallisation performance of the PCM is improved.

Example 6

Starting from the hexahydrate form of zinc nitrate and the tetrahydrate form of calcium nitrate: amounts of zinc nitrate hexahydrate ranging from about 5% to 50% by weight of the total sample weight into an amount of calcium nitrate tetrahydrate to balance were mixed together. The mixture of nitrate hydrates was heated about 2-5° C. above the melting transition temperature of calcium nitrate tetrahydrate (around 43° C.). Maintaining this temperature, the mixture was stirred until a clear, colourless, homogeneous liquid is obtained. The liquid was then transferred to a control thermal cycling apparatus and repeatedly cooled and heated while logging the internal temperature using a thermocouple.

Figure 12:
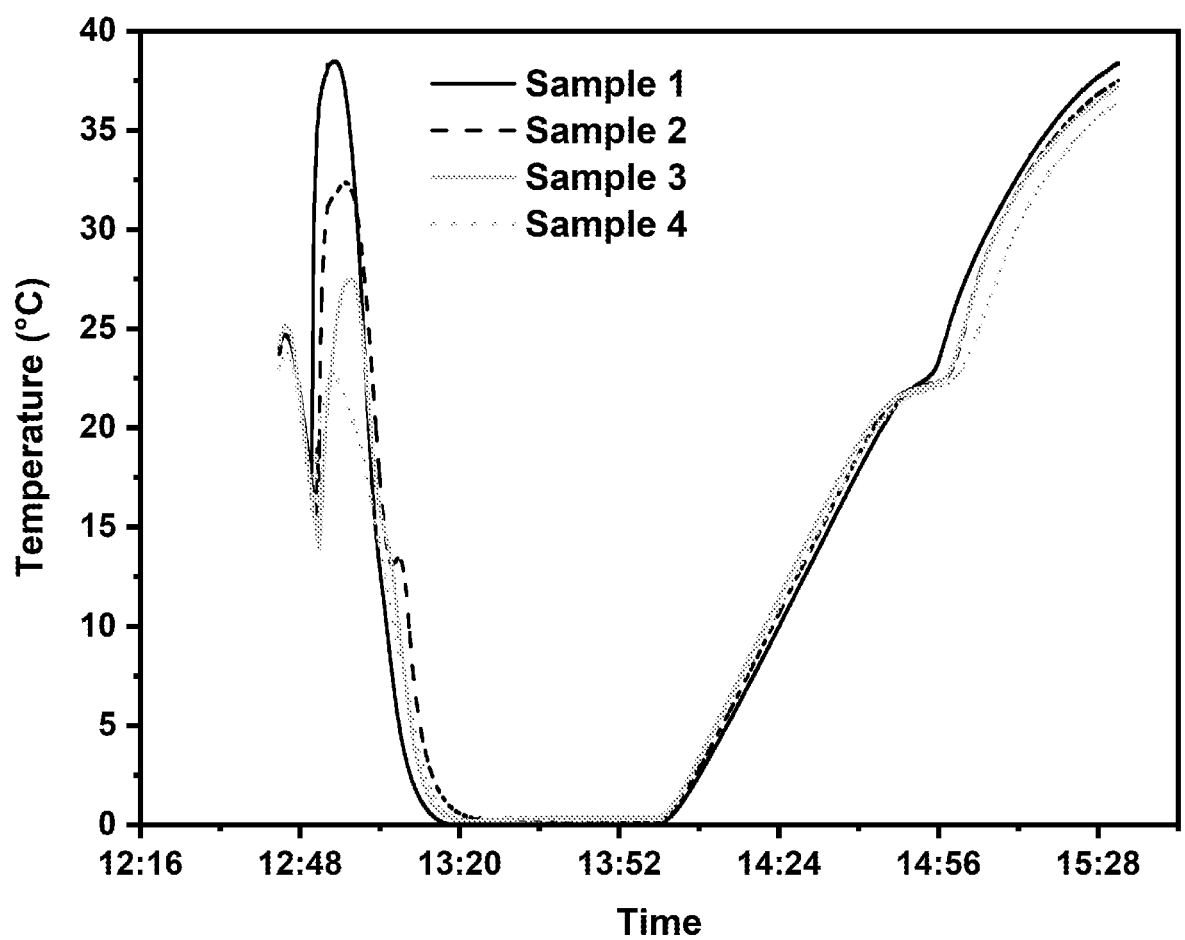
FIGS. 12 & 13 show thermal cycles of calcium nitrate tetrahydrate containing various amounts of zinc nitrate hexahydrate.
Figure 13:
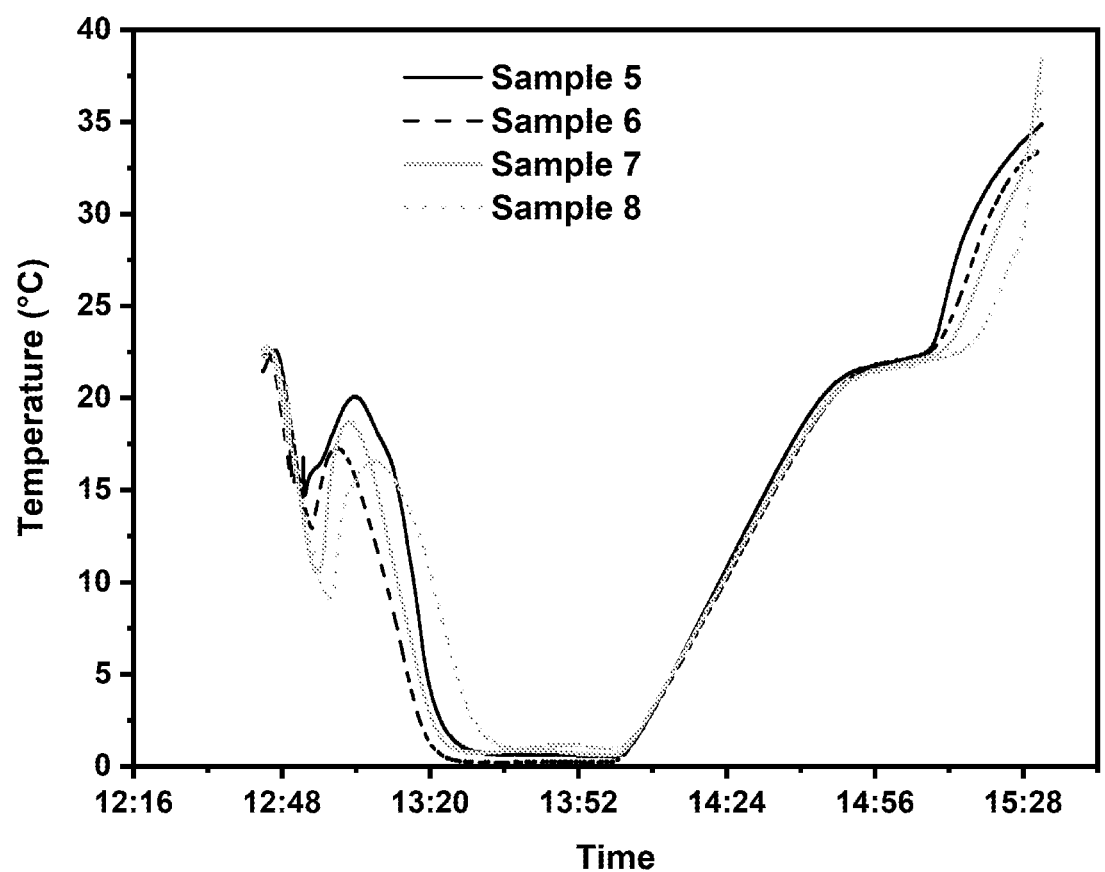

An example thermal cycle is given in FIGS. 12 & 13.

Nucleation of the PCM mixture may be initiated by low temperatures, as is the case in FIGS. 12 & 13, seeding, or by addition of a nucleation agent. On addition of a few crystals of magnesium nitrate hexahydrate and strontium nitrate tetrahydrate, nucleation was initiated in the sub-cooled melt. The eutectic mixture of calcium nitrate tetrahydrate and zinc nitrate tetrahydrate containing the magnesium nitrate hexahydrate-strontium nitrate tetrahydrate nucleator was prepared and added to a plastic pouch which was subsequently sealed and placed into a 3-layer calorimetry set up and thermally cycled.

Figure 14:
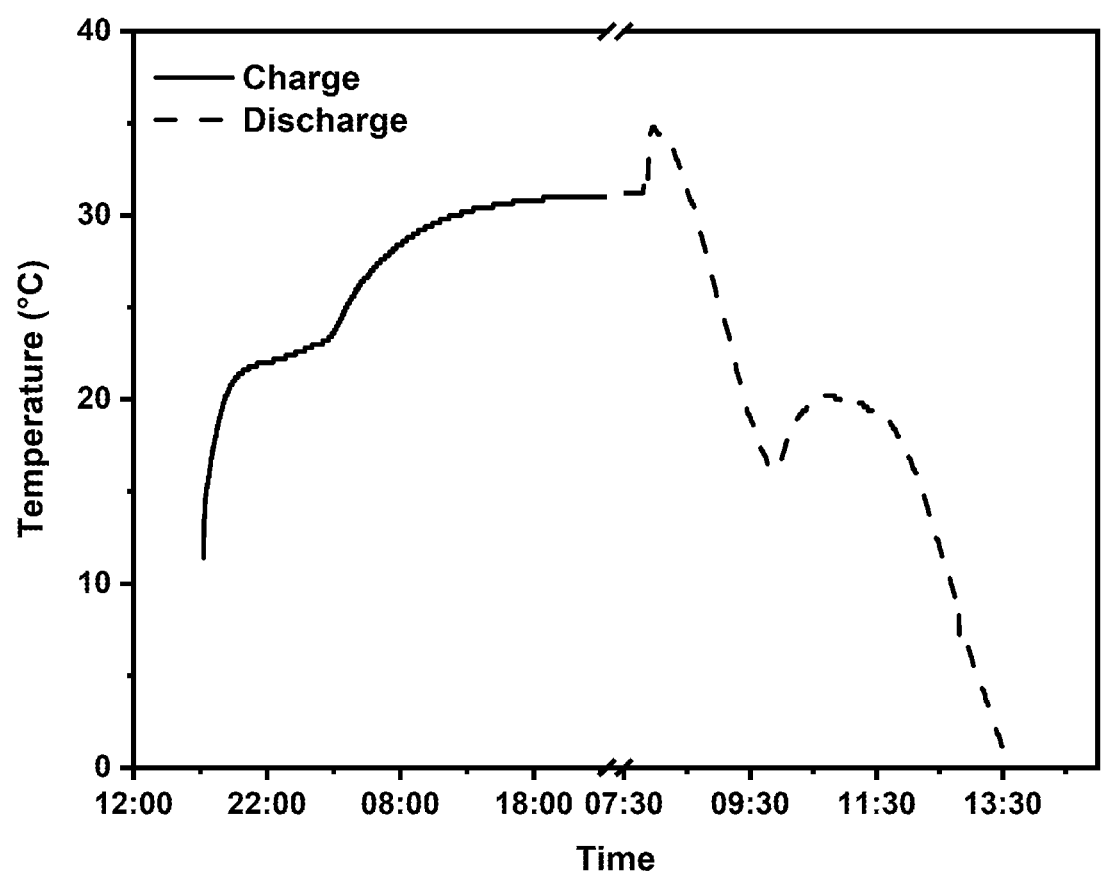
FIG. 14 shows a thermal cycle of one particular calcium nitrate tetrahydrate sample containing zinc nitrate hexahydrate and a nucleation agent in a 3-layer calorimetry set up. Note should be given to the axis break on the x-axis.

An example thermal cycle is given in FIG. 14.

Minimal sub-cooling was observed in the presence of the nucleation agent.

Thereby several PCM compositions comprised of calcium nitrate tetrahydrate and zinc nitrate hexahydrate are identified, and the degree of melting point depression achieved quantified.

Example 7

Starting from anhydrous lithium nitrate and the tetrahydrate form of calcium nitrate: to anhydrous lithium nitrate was added water such that the trihydrate composition (56.79% $LiNO_3$, 43.91% $H_2O$) was obtained. An amount of calcium nitrate tetrahydrate was added to this material such that the resulting PCM contained between about 40% and 95% calcium nitrate tetrahydrate and lithium nitrate trihydrate to balance. The mixture of nitrate hydrates was heated about 2-5° C. above the melting transition temperature of calcium nitrate tetrahydrate (around 43° C.). Maintaining this temperature, the mixture was stirred until a clear, colourless, homogeneous liquid is obtained. The liquid was then transferred to a plastic pouch which was subsequently sealed and placed into a 3-layer calorimetry set up and thermally cycled.

Figure 15:
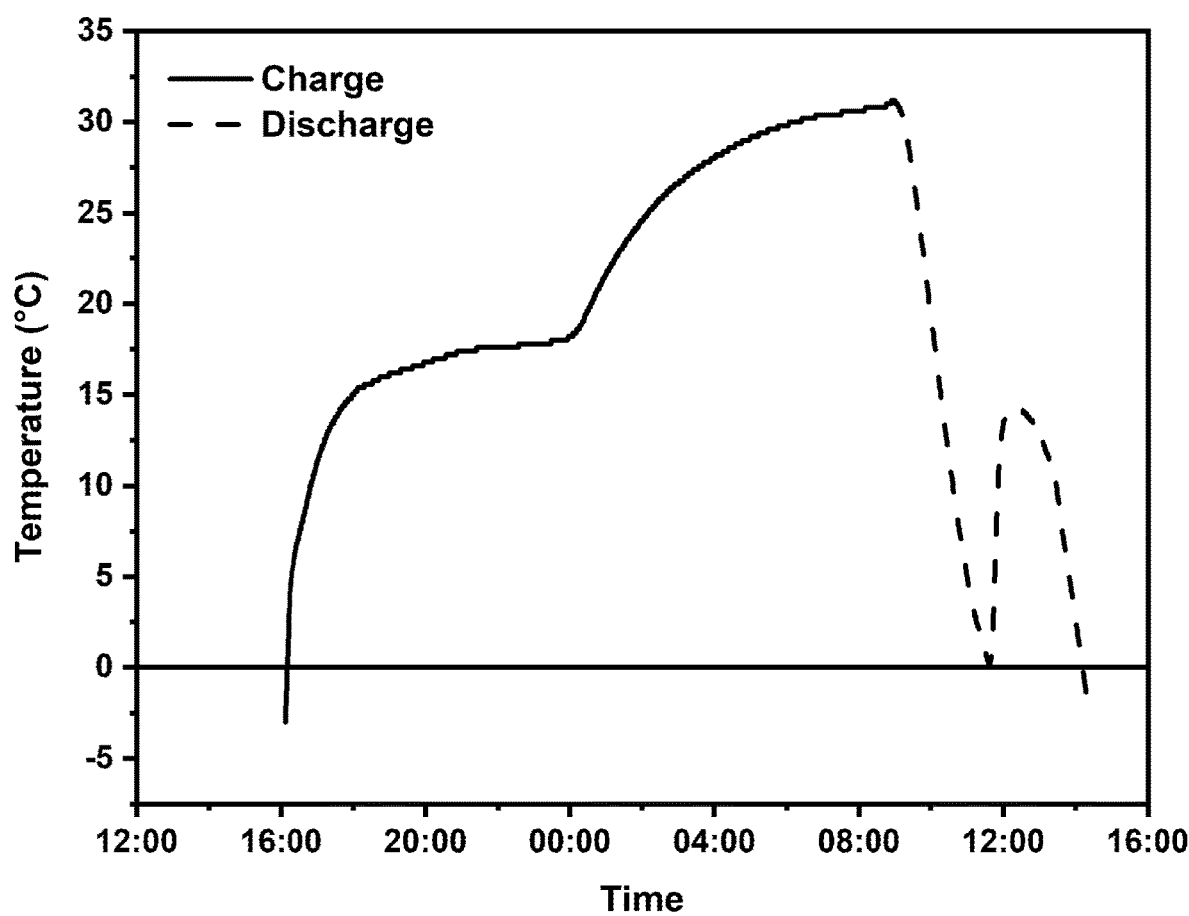
FIG. 15 shows a thermal cycle of a particular composition of calcium nitrate tetrahydrate containing lithium nitrate trihydrate without any nucleation agent in a 3-layer calorimetry set up.

An example thermal cycle of one particular PCM composition is given in FIG. 15.

Figure 16:
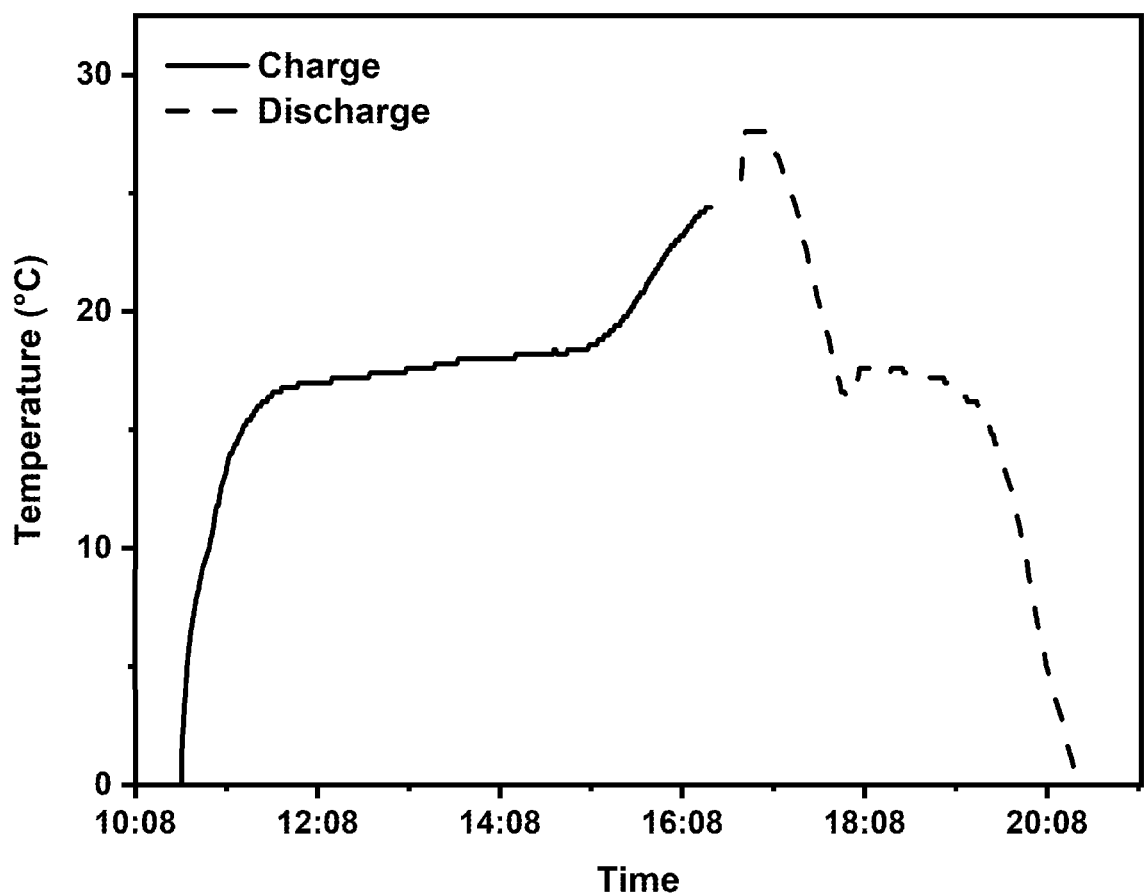
FIG. 16 shows a thermal cycle of a particular composition of calcium nitrate tetrahydrate containing lithium nitrate trihydrate with a nucleation agent in a 3-layer calorimetry set up.

On addition of a few crystals of magnesium nitrate hexahydrate and strontium nitrate tetrahydrate, nucleation was initiated in the sub-cooled melt, without the need to cool to dramatically low temperatures. An example thermal cycle after addition of the nucleation agent is given in FIG. 16. A clear reduction in the subcooling is noted on addition of the nucleation agent.

Using this method, the melting/crystallisation temperature and energy densities of a range of materials comprised of calcium nitrate tetrahydrate and lithium nitrate trihydrate are obtained.

Example 8

Starting from the hemipentahydrate form of copper nitrate and calcium nitrate tetrahydrate: to copper nitrate hemipentahydrate was added water such that upon addition of the full amount of water the composition of copper nitrate hexahydrate (63.44% $Cu(NO_3)_2$, 36.53% $H_2O$) was obtained. An amount of calcium nitrate tetrahydrate was added to this material such that the resulting PCM contained between about 20% and 95% calcium nitrate tetrahydrate and copper nitrate hexahydrate. The mixture of nitrate hydrates was heated about 2-5° C. above the melting transition temperature of calcium nitrate tetrahydrate (around 43° C.). Maintaining this temperature, the mixture was stirred until a clear, blue, homogeneous liquid is obtained. The liquid was then transferred to a control thermal cycling apparatus and repeatedly cooled and heated while logging the internal temperature using a thermocouple. Nucleation of the PCM mixture may be initiated by low temperatures, seeding, or by addition of a nucleation agent.

Figure 17:
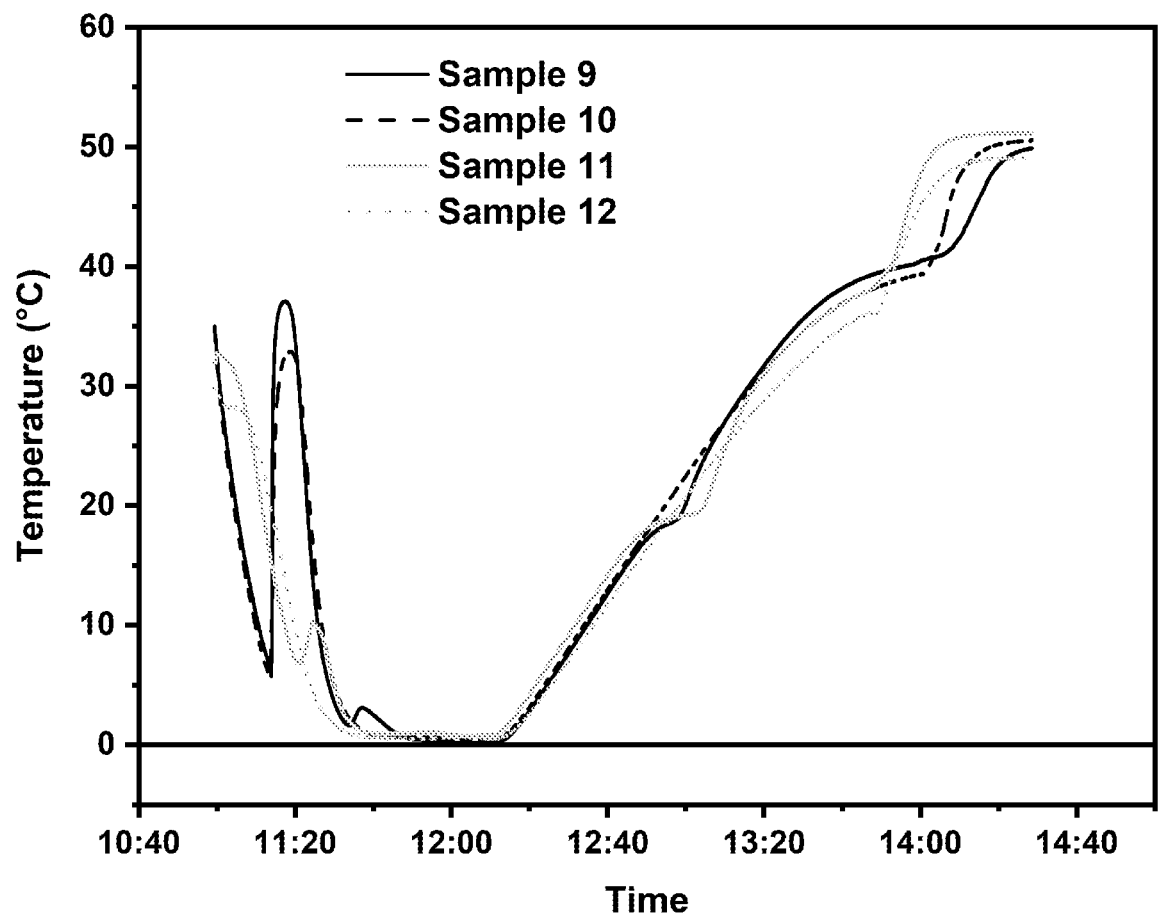
FIGS. 17-19 show example thermal cycles of calcium nitrate tetrahydrate containing various amounts of copper nitrate hexahydrate.
Figure 18:
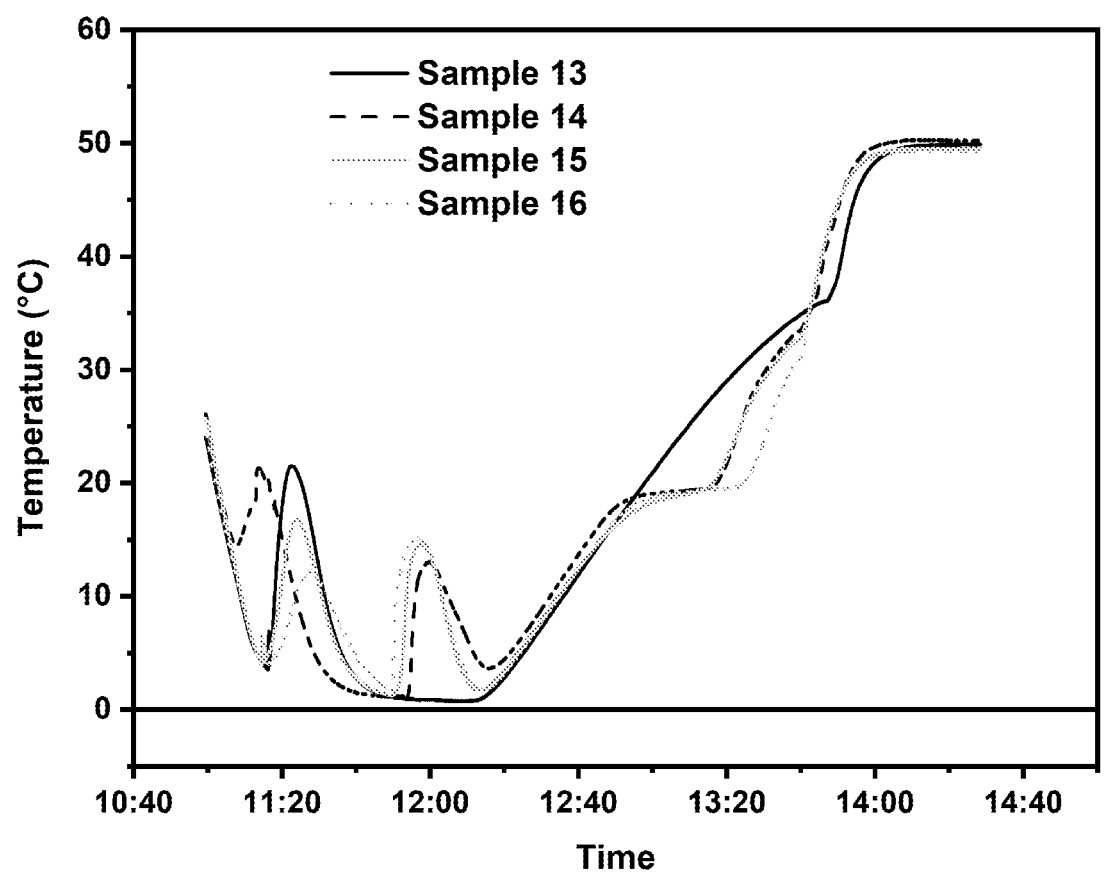
Figure 19:
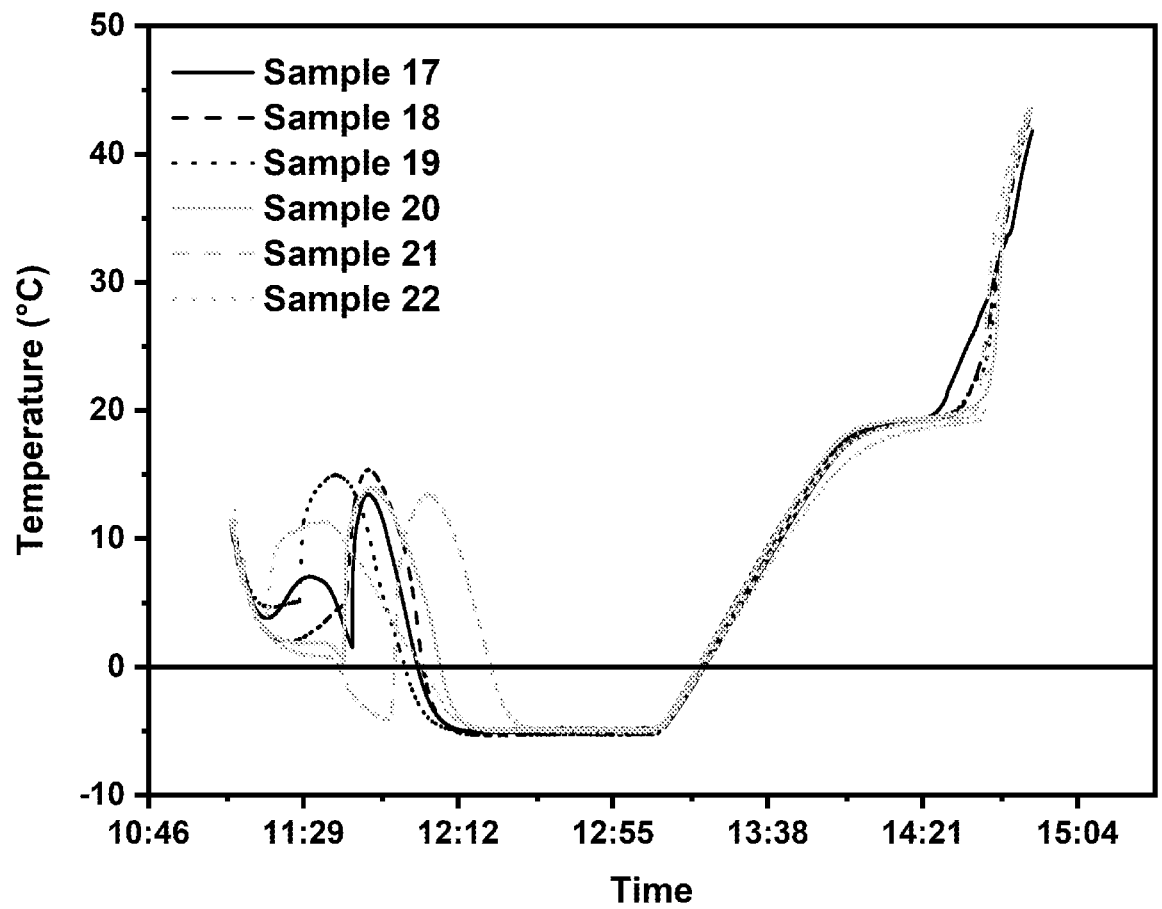

Example thermal cycles are given in FIG. 17-19.

On addition of a few crystals of magnesium nitrate hexahydrate and strontium nitrate tetrahydrate, nucleation was initiated in the sub-cooled melt. The liquid was then transferred to a plastic pouch which was subsequently sealed and placed into a 3-layer calorimetry set up and thermally cycled.

Figure 20:
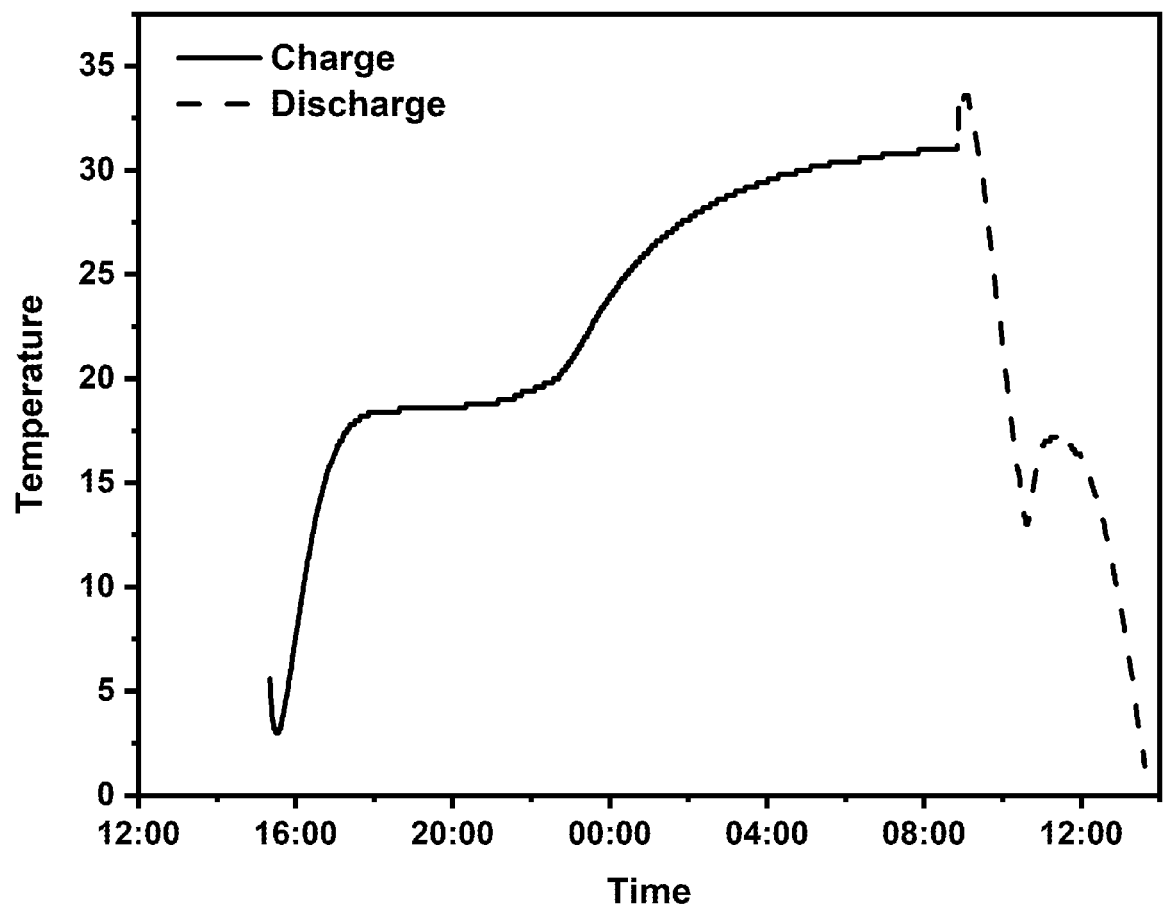
FIG. 20 shows a thermal cycle of a particular composition of calcium nitrate tetrahydrate containing copper nitrate hexahydrate with a nucleation agent in a 3-layer calorimetry set up.

An example thermal cycle of the PCM containing the nucleation agents is given in FIG. 20.

Little sub-cooling was noted.

Thereby several PCM compositions comprised of calcium nitrate tetrahydrate and copper nitrate hexahydrate are identified, and the degree of melting point depression achieved quantified.

Example 9

Starting from the tetrahydrate form of manganese nitrate and zinc nitrate hexahydrate: to manganese nitrate tetrahydrate was added water such that upon addition of the full amount of water the composition of manganese nitrate hexahydrate (62.37% $Mn(NO_3)_2$, 37.63% $H_2O$) was obtained. An amount of zinc nitrate hexahydrate was added to this material such that the resulting PCM contained between about 15% and 85% zinc nitrate hexahydrate with manganese nitrate hexahydrate to balance. The mixture of nitrate hydrates was heated to around 40° C. Maintaining this temperature, the mixture was stirred until a clear, slightly pink, homogeneous liquid is obtained. The liquid was then transferred to a control thermal cycling apparatus and repeatedly cooled and heated while logging the internal temperature using a thermocouple. Nucleation of the PCM mixture may be initiated by low temperatures, seeding, or by addition of a nucleation agent.

Figure 21:
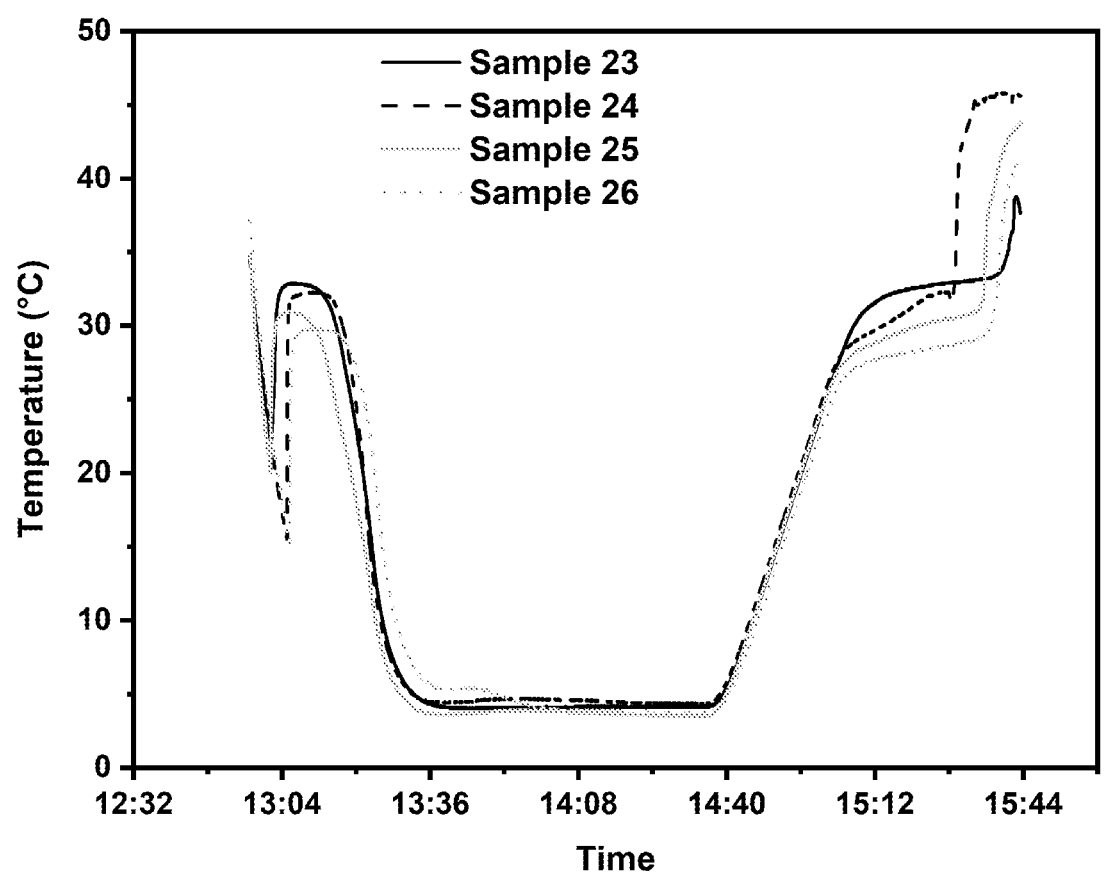
FIGS. 21 & 22 shows thermal cycles of manganese nitrate hexahydrate containing various amounts of zinc nitrate hexahydrate.
Figure 22:
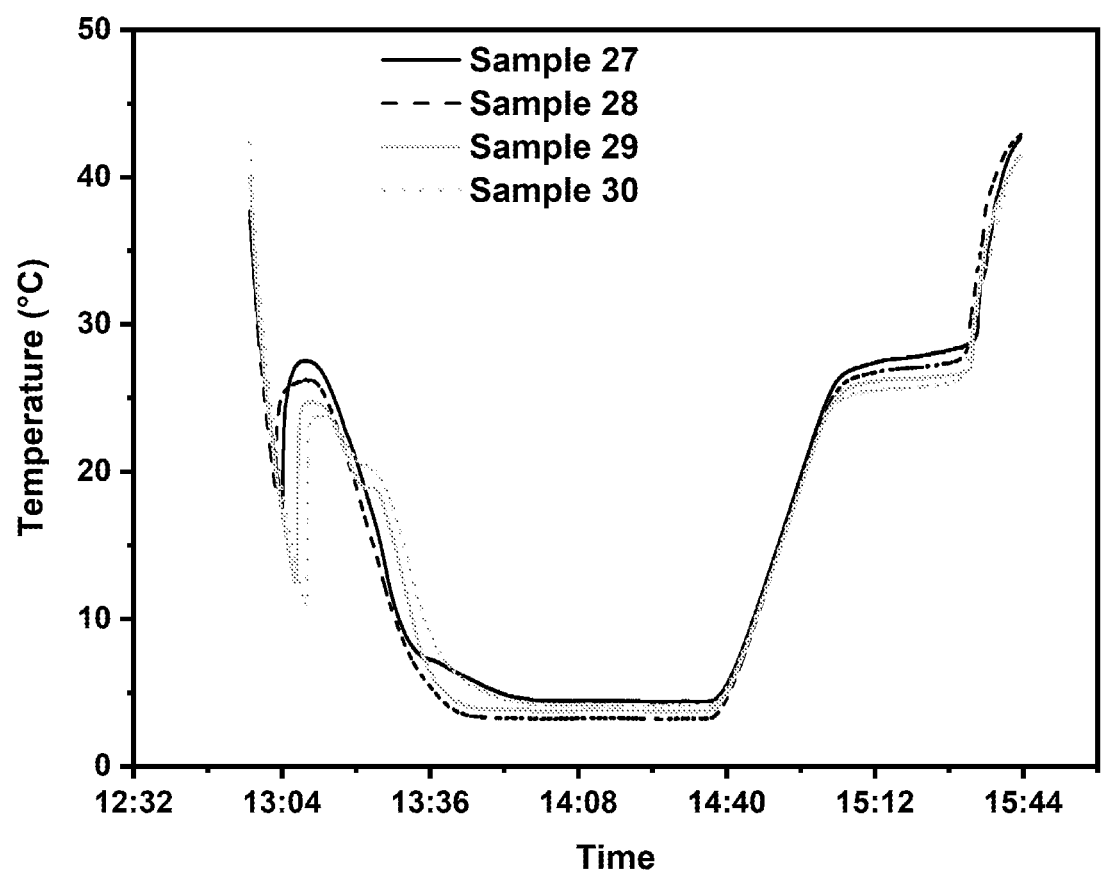

An example thermal cycle without nucleation agents is given in FIGS. 21 & 22. In this case, while the melting transition remained approximately flat across all the samples, a variation in the melting point as achieved.

Thereby several PCM compositions comprised of manganese nitrate hexahydrate and zinc nitrate hexahydrate are identified, and the degree of melting point depression achieved quantified.

Figure 23:
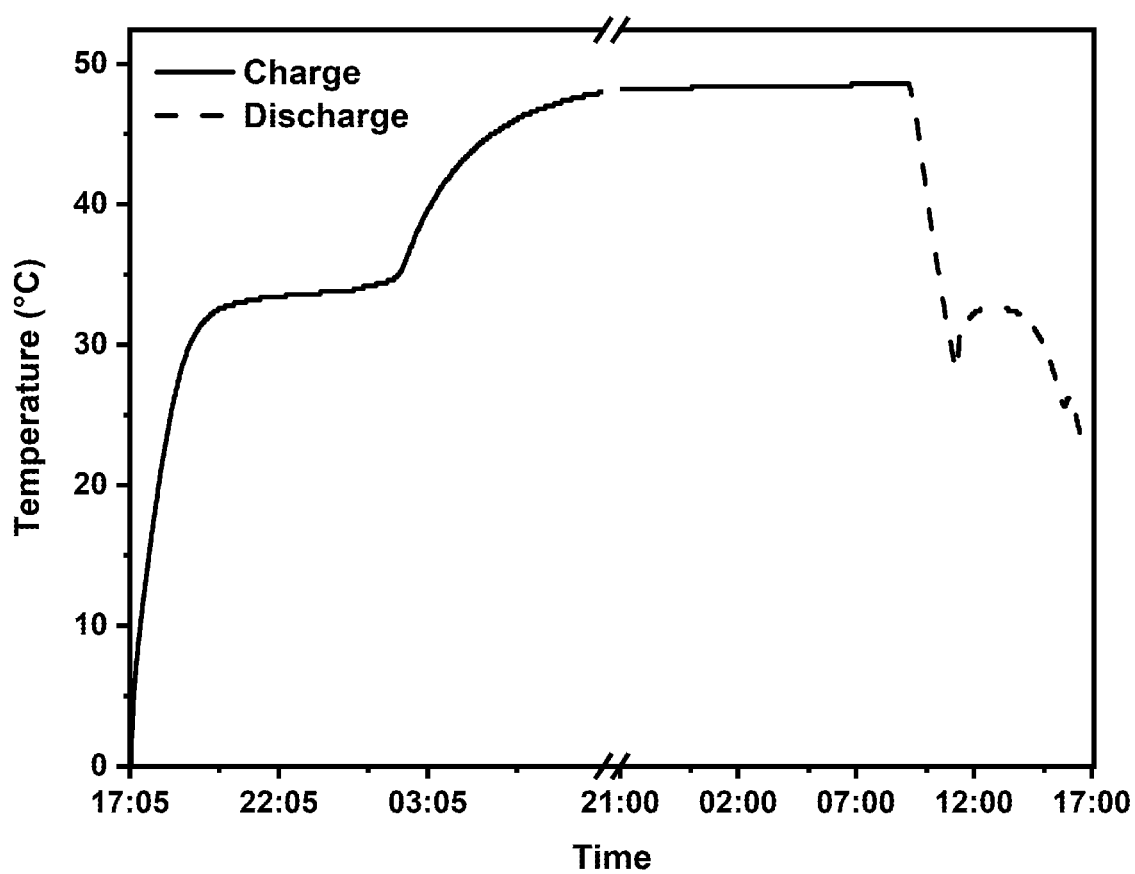
FIG. 23 shows a thermal cycle of a particular composition of zinc nitrate hexahydrate containing manganese nitrate hexahydrate with a nucleation agent in a 3-layer calorimetry set up.

To overcome sub-cooling, a nucleation agent based on the combination of magnesium, strontium and barium nitrates were added to a sample of one combination of manganese nitrate hexahydrate and zinc nitrate hexahydrate (sample 23). The resulting PCM was then thermally cycled using a 3-layer calorimetry set up. The thermal cycle data is given in FIG. 23. Little sub-cooling was noted, in stark contrast from the pure sample 23 as detailed in FIG. 21. Thereby it is established that the combination of magnesium, strontium and barium nitrates are effective nucleators for blended zinc nitrate hexahydrate and manganese nitrate hexahydrate PCMs.

Whilst specific embodiments of the present invention have been described above, it will be appreciated that departures from the described embodiments may still fall within the scope of the present invention. For example, any suitable type of combination of metal nitrates or metal nitrate hydrates may be used. Moreover, any suitable type of group II metal nitrates or metal nitrate hydrates may be used as a nucleation agent.

The invention claimed is:

1. A phase-change material (PCM) consisting essentially of:
   calcium nitrate tetrahydrate;
   a nucleation agent, wherein the nucleation agent is a mixture of:

magnesium nitrate or a hydrate thereof, and
strontium nitrate and a hydrate thereof; and
optionally, copper nitrate, zinc nitrate, iron nitrate, or a hydrate thereof.

2. A PCM according to claim 1, wherein the PCM consists essentially of:
   between about 98% to 99.6% by weight of calcium nitrate tetrahydrate;
   between about 0.2% to 1% by weight of strontium nitrate or a hydrate thereof; and
   between about 0.2% to 1% by weight of magnesium nitrate or a hydrate thereof.

3. A PCM according to claim 1, wherein the PCM is any one selected from the group consisting of:
   about 99.2% by weight calcium nitrate tetrahydrate, about 0.4% by weight strontium nitrate tetrahydrate and about 0.4% by weight magnesium nitrate hexahydrate;
   about 99.4% by weight calcium nitrate tetrahydrate, about 0.3% by weight strontium nitrate and about 0.3% by weight magnesium nitrate dihydrate;
   about 39.7% by weight calcium nitrate tetrahydrate, about 59.5% by weight copper nitrate hexahydrate, about 0.4% by weight strontium nitrate tetrahydrate and about 0.4% by weight magnesium nitrate hexahydrate;
   about 59.5% by weight calcium nitrate tetrahydrate, about 39.7% by weight zinc nitrate hexahydrate, about 0.4% by weight strontium nitrate tetrahydrate and about 0.4% by weight magnesium nitrate hexahydrate; or
   about 44.6% by weight calcium nitrate tetrahydrate, about 54.6% by weight iron nitrate nonahydrate, about 0.4% by weight strontium nitrate tetrahydrate and about 0.4% by weight magnesium nitrate hexahydrate.

4. A PCM according to claim 3, wherein the PCM has a melting temperature lower than that of each individual component.

5. A PCM according to claim 3, wherein the PCM is a eutectic mixture; and/or
   wherein the PCM is a binary, ternary or quaternary eutectic mixture of the components.

6. A PCM according to claim 1, wherein the nucleation agent is present in at least about 0.1% by weight of the PCM.

7. A method of preparing a phase-change material (PCM) composition, comprising:
   heating a mixture of metal nitrate components consisting essentially of calcium nitrate tetrahydrate, a nucleation agent, and, optionally, copper nitrate, zinc nitrate, iron nitrate, or a hydrate thereof above a melting transition temperature of one or more of the metal nitrate components and stirring to form the PCM composition as a single pourable liquid,
   wherein the nucleation agent consists essentially of a mixture of:
   magnesium nitrate or a hydrate thereof, and
   strontium nitrate or a hydrate thereof.

* * * * *